United States Patent
Dehlaghi et al.

(10) Patent No.: US 10,135,604 B1
(45) Date of Patent: Nov. 20, 2018

(54) RECEIVER RECOVERING A SIGNAL CLOCK FROM A RECEIVED DATA SIGNAL, AND A CLOCK RECOVERY METHOD IMPLEMENTED IN THE RECEIVER

(71) Applicants: Behzad Dehlaghi, Richmond Hill (CA); Shayan Shahramian, Richmond Hill (CA)

(72) Inventors: Behzad Dehlaghi, Richmond Hill (CA); Shayan Shahramian, Richmond Hill (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/809,065

(22) Filed: Nov. 10, 2017

(51) Int. Cl.
   *H04L 7/033* (2006.01)

(52) U.S. Cl.
   CPC .................. *H04L 7/033* (2013.01)

(58) Field of Classification Search
   CPC .......... H04L 7/033; H04L 7/02; H03L 7/0814
   See application file for complete search history.

(56) References Cited

U.S. PATENT DOCUMENTS

| | | | | |
|---|---|---|---|---|
| 9,973,332 B2* | 5/2018 | Hsieh | ........................ | H04L 7/02 |
| 2006/0062341 A1* | 3/2006 | Edmondson | .......... | H03L 7/0814 |
| | | | | 375/376 |
| 2009/0296867 A1 | 12/2009 | Do et al. | | |
| 2010/0158177 A1 | 6/2010 | Doblar et al. | | |
| 2014/0126678 A1* | 5/2014 | Cirit | ........................ | H04L 7/033 |
| | | | | 375/375 |

FOREIGN PATENT DOCUMENTS

| | | |
|---|---|---|
| CN | 105577350 A | 5/2016 |
| CN | 107147379 A | 9/2017 |

OTHER PUBLICATIONS

Toifl et al., A 22-Gb/s PAM-4 receiver in 90-nm CMOS SOI technology, IEEE Journal of Solid-State Circuits, Apr. 2006, pp. 954-965, vol. 41, No. 4.
Zerbe et al., Equalization and clock recovery for a 2.5-10-Gb/s 2-PAM/4-PAM backplane transceiver cell, IEEE Journal of Solid-State Circuits, Dec. 2003, pp. 2121-2130, vol. 38, No. 12.

* cited by examiner

*Primary Examiner* — Jaison Joseph
(74) *Attorney, Agent, or Firm* — BCF LLP

(57) ABSTRACT

The present disclosure relates to a receiver and to a method implemented in the receiver for recovering a signal clock from a received data signal. Successive edge transitions between successive data samples of the received data signal are detected according to a clock recovered in the receiver. The recovered clock is adjusted based on a combination of weights assigned to at least some edge transitions among the plurality of successive edge transitions. In particular, (i) each very early transition is assigned a first weight having a first sign, (ii) each early transition is assigned a second weight having the first sign, (iii) each late transition is assigned a third weight having a second sign opposite from the first sign, and (iv) each very late transition is assigned a fourth weight having the second sign.

27 Claims, 12 Drawing Sheets

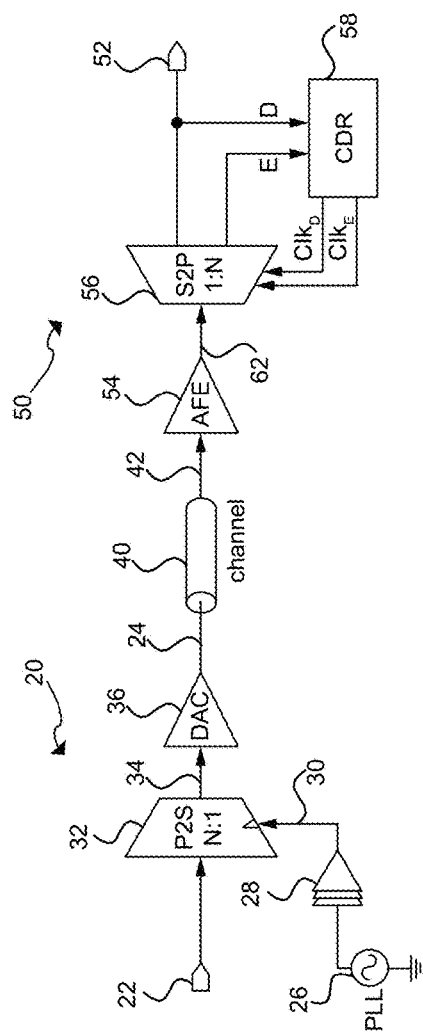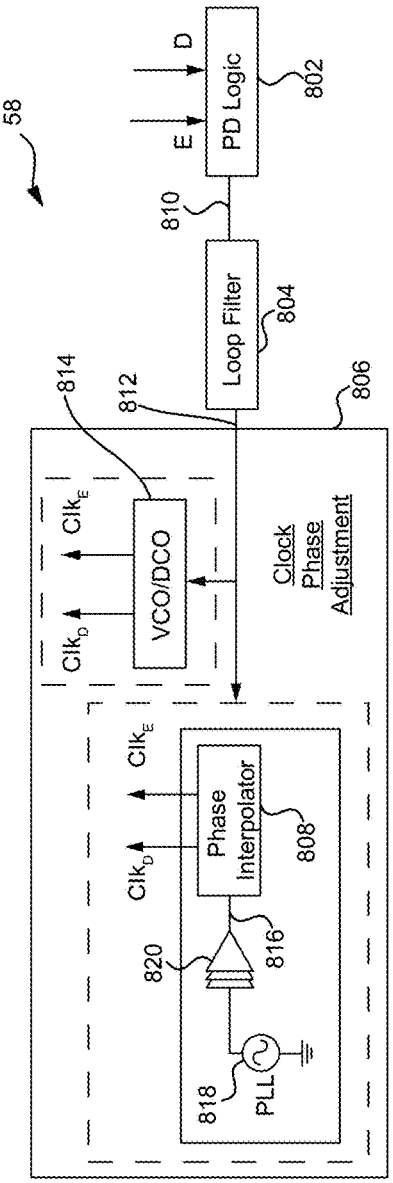
Figure 2a
Figure 2b

RECEIVER RECOVERING A SIGNAL CLOCK FROM A RECEIVED DATA SIGNAL, AND A CLOCK RECOVERY METHOD IMPLEMENTED IN THE RECEIVER

CROSS-REFERENCE

None.

TECHNICAL FIELD

The present disclosure relates to the field of digital communication technology and in particular to method implemented in a receiver for recovering a clock from a received data signal and to a receiver implementing a clock recovery method.

BACKGROUND

In many technologies, digital data streams are transmitted without a clock signal. Clock recovery is required at a receiver end in order to retrieve the transmitted data. To the end, the receiver generates a clock from an approximate frequency reference, and then phase-aligns the generated clock with the data stream. This process is known as clock-data recovery (CDR).

A number of techniques have been developed to accomplish CDR. However, the existing techniques require complex receiver front-end components that occupy space and consume power.

SUMMARY

It is an object of the present technology to ameliorate at least some of the inconveniences present in conventional clock recovery solutions used, for example, in the context of digital communication technology.

Generally stated, the present technology provides a clock recovery technique that detects very early and very late edge transitions, which may indicate an important misalignment between a recovered clock and a signal clock. In addition to using early and late transitions to adjust the phase of the recovered clock, more weight is given to the detection of very early and very late edge transitions. In an aspect, using the detection of very early and very late transitions in combination with distinct weighting factors assigned to early/late transitions and to very early/very late transitions may allow reducing the size, complexity and power consumption of an analog front-end on a receiver, with no degradation of the clock recovery performance. The present technology is applicable to various types of digital communication technology, including without limitation electrical and optical communication technologies.

According to one aspect of the present technology, there is provided a method implemented in a receiver for recovering a signal clock from a received data signal. The method comprises detecting, according to a clock recovered in the receiver, a plurality of successive edge transitions between successive data samples of the received data signal; and adjusting the recovered clock based on a combination of weights assigned to at least some edge transitions among the plurality of successive edge transitions, wherein (i) each very early transition is assigned a first weight having a first sign, (ii) each early transition is assigned a second weight having the first sign, (iii) each late transition is assigned a third weight having a second sign opposite from the first sign, and (iv) each very late transition is assigned a fourth weight having the second sign.

In some implementations of the present technology, the method further comprises deriving clock adjustments from phase error indications based on the combination of the weights.

In some implementations of the present technology, adjusting the recovered clock comprises delaying the recovered clock when a given phase error indication indicates that a phase of the recovered clock precedes a phase of the signal clock; and advancing the recovered clock when the given phase error indication indicates that the phase of the recovered clock is behind the phase of the signal clock.

In some implementations of the present technology, the second and third weights have a first magnitude, the first and fourth weights having a second magnitude greater than the first magnitude.

In some implementations of the present technology, the method further comprises filtering successive phase error indications to provide a long term clock phase adjustment, wherein adjusting the recovered clock based on the phase error indications comprises adjusting the recovered clock based on the long term clock phase adjustment.

In some implementations of the present technology, the phase error indication is determined as one of equal to the first weight when a number of very early transitions exceeds a number of very late transitions; equal to the fourth weight when the number of very late transitions exceeds the number of very early transitions; equal to the second weight when a number of early transitions exceeds a number of late transitions while the number of very early transitions is equal to the number of very late transitions; equal to the third weight when the number of late transitions exceeds the number of early transitions while the number of very early transitions is equal to the number of very late transitions; and a neutral value when the number of late transitions is equal to the number of early transitions while the number of very early transitions is equal to the number of very late transitions.

In some implementations of the present technology, determining each phase error indication further comprises determining a sum of the weights assigned to the at least some edge transitions.

In some implementations of the present technology, determining each phase error indication further comprises dividing the sum of the weights assigned to the at least some edge transitions by an averaging factor.

In some implementations of the present technology, the recovered clock comprises an edge clock and a data clock, the edge and data clocks sharing a same frequency and being separated by a phase difference; detecting a given edge transition among the plurality of successive edge transitions between the successive data samples of the received data signal comprising determining a first value of the received data signal upon a first transition of the data clock, determining a second value of the data signal upon a transition of the edge clock immediately following the first transition of the data clock, and determining a third value of the received data signal upon a second transition of the data clock immediately following the transition of the edge clock; the given edge transition being classified by applying the first, second and third values of the received data signal to a mapping table containing edge transition classes as a function of the first, second and third values of the received data signal.

In some implementations of the present technology, the method further comprises decoding a first data sample by comparing the first value of the received data signal to a high threshold, a middle threshold and a low threshold, wherein the first data sample is equal to a first logical value if the first value is greater than the high threshold, a second logical value if the first value is less than the high threshold and greater than the middle threshold, a third logical value if the first value is less than the middle threshold and greater than the low threshold, and a fourth logical value if the first value is less than the low threshold; decoding a second data sample by comparing the third value of the received data signal to the high threshold, the middle threshold and the low threshold, the first data sample having the first logical value if the third value is greater than the high threshold, the second logical value if the third value is less than the high threshold and greater than the middle threshold, the third logical value if the third value is less than the middle threshold and greater than the low threshold, and the fourth logical value if the third value is less than the low threshold; the method further comprising evaluating a given edge sample at the given edge transition by comparing the second value of the received data signal to the middle threshold, the given edge sample being equal to a fifth logical value if the second value is greater than the middle threshold and equal to a sixth logical value if the second value is less than the middle threshold.

In some implementations of the present technology, the first logical value is (1,1); the second logical value is (1,0); the third logical value is (0,1); the fourth logical value is (0,0); the fifth logical value is (1); and the sixth logical value is (0).

In some implementations of the present technology, in the mapping table, the given edge transition is classified as very late when the first data sample is equal to the fourth logical value, the second data sample is equal to the second logical value, and the given edge sample is equal to the fifth logical value; the given edge transition is classified as very late when the first data sample is equal to the first logical value, the second data sample is equal to the third logical value, and the given edge sample is equal to the sixth logical value; the given edge transition is classified as very early when the first data sample is equal to the third logical value, the second data sample is equal to the first logical value, and the given edge sample is equal to the sixth logical value; the given edge transition is classified as very early when the first data sample is equal to the second logical value, the second data sample is equal to the fourth logical value, and the given edge sample is equal to the fifth logical value; the given edge transition is classified as early when the first data sample is equal to the fourth logical value, the second data sample is equal to the first logical value, and the given edge sample is equal to the sixth logical value; the given edge transition is classified as late when the first data sample is equal to the fourth logical value, the second data sample is equal to the first logical value, and the given edge sample is equal to the fifth logical value; the given edge transition is classified as early when the first data sample is equal to the first logical value, the second data sample is equal to the fourth logical value, and the given edge sample is equal to the fifth logical value; the given edge transition is classified as late when the first data sample is equal to the first logical value, the second data sample is equal to the fourth logical value, and the given edge sample is equal to the sixth logical value; and the given edge transition is classified as unknown in other combinations of the first data sample, the second data sample and the given edge sample.

In some implementations of the present technology, the receiver is selected from a quarter-rate receiver and a higher-order receiver.

In some implementations of the present technology, the receiver operates at quarter-rate; the recovered clock has four distinct phases; and four successive edge transitions of the plurality of successive edge transitions are detected according to four successive recovered clock phases.

According to another aspect of the present technology, there is provided a receiver, comprising an analog front-end adapted for receiving a data signal from a channel; a serial to parallel converter module comprising at least one edge latch adapted for detecting, according to a recovered clock, a plurality of successive edge transitions between successive data samples of the received data signal; and a clock-data recovery (CDR) module adapted for generating the recovered clock based on a combination of weights assigned to at least some edge transitions among the plurality of successive edge transitions, wherein (i) each very early transition is assigned a first weight having a first sign, (ii) each early transition is assigned a second weight having the first sign, (iii) each late transition is assigned a third weight having a second sign opposite from the first sign, and (iv) each very late transition is assigned a fourth weight having the second sign.

In some implementations of the present technology, the CDR module is further adapted for deriving clock adjustments from phase error indications based on the combination of the weights.

In some implementations of the present technology, the CDR module comprises: a phase detection logic module adapted to classify the at least some edge transitions, assign the first, second third and fourth weights to each of the at least some edge transitions, and determine the phase error indications; a filter adapted to filter a plurality of successive phase error indications to generate the clock phase control signal; and a clock phase adjustment module adapted to generate the recovered clock according to the clock phase control signal.

In some implementations of the present technology, the clock phase adjustment module further comprises: a clock generator adapted for creating a base clock signal; and a phase interpolator module adapted to generate the recovered clock by modifying a phase of the base clock signal according to the clock phase control signal.

In some implementations of the present technology, the clock phase adjustment module further comprises an oscillator adapted for generating the recovered clock in response to the clock phase control signal.

In some implementations of the present technology, the CDR module is further adapted for determining a plurality of successive phase error indications based on a plurality of successive combinations of the weights assigned to the at least some edge transitions.

In some implementations of the present technology, the recovered clock includes four edge clock phases; and the at least one edge latch comprises four edge latches, each of the four edge latches being adapted for detecting every fourth one of the plurality of successive edge transitions according to a corresponding one of the four edge clock phases.

In some implementations of the present technology, the receiver further comprises a first reference module providing a middle threshold, each of the four edge latches detecting every fourth one of the plurality of successive edge transitions by comparing a level of the data signal with the middle threshold.

In some implementations of the present technology, the receiver further comprises a second reference module providing a high threshold and a third reference module proving a low threshold, the recovered clock further includes four data clock phases corresponding to the four edge clock phases, each pair comprising a data clock phase and a corresponding edge clock phase being separated by a phase difference; the analog front-end further comprising first, second and third groups of data latches, each one of the first, first, second and third groups of data latches comprising four data latches; each of the four data latches in the first group of data latches being adapted for comparing the level of the data signal with the high threshold according to a corresponding one of the four data clock phases; each of the four data latches in the second group of data latches being adapted for comparing the level of the data signal with the middle threshold according to a corresponding one of the four data clock phases; and each of the four data latches in the third group of data latches being adapted for comparing the level of the data signal with the low threshold according to a corresponding one of the four data clock phases.

In some implementations of the present technology, the receiver further comprises a thermometer to binary converter adapted for combining comparison results from the first, second and third groups of data latches into four successive pairs of bits, each pair including a most significant bit and a least significant bit indicating a value of a corresponding data sample; a first serial-to-parallel converter adapted for combining a plurality of successive most significant bits indicating values of successive data samples into a first word; a second serial-to-parallel converter adapted for combining a plurality of successive least significant bits indicating values of successive data samples into a second word; and a third serial-to-parallel converter adapted for combining a plurality of successive comparison results from the four edge latches into a third word; the CDR module being further adapted for classifying the at least some edge transitions among the plurality of successive edge transitions based on contents of the first, second and third words.

In some implementations of the present technology, the first, second and third words are 32-bit words.

According to a further aspect of the present technology, there is provided a non-transitory computer readable medium having computer executable instructions stored thereon that, when executed, cause a processor to receive indications of a plurality of successive edge transitions between successive data samples of a data signal; classify at least some edge transitions among the plurality of successive edge transitions as very early, early, late or very late transitions; assign (i) a first weight having a first sign to each very early transition, (ii) a second weight having the first sign to each early transition, (iii) a third weight having a second sign opposite from the first sign to each late transition, and (iv) a fourth weight having the second sign to each very late transition; determine a phase error indication based on a combination of the weights assigned to the at least some edge transitions; and determine a clock phase adjustment based on the phase error indication.

In some implementations of the present technology, the non-transitory computer readable medium further has computer executable instructions stored thereon that, when executed, cause the processor to determine a plurality of successive phase error indications based on a plurality of successive combinations of the weights assigned to the at least some edge transitions; and filter the plurality of successive phase error indications before generating each one of a plurality of successive clock phase adjustments.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

Embodiments of the present disclosure will be described by way of example only with reference to the accompanying drawings, in which:

FIG. 2a is a block diagram representing a transmitter and receiver communicating through a channel;

FIG. 2b is a block diagram of a clock data recovery (CDR) module implemented in the receiver of FIG. 2a;

Like numerals represent like features on the various drawings.

DETAILED DESCRIPTION

Various aspects of the present disclosure generally address one or more of the problems related to the complexity and power consumption of receiver front-end components used to recover a clock from a received data signal.

Conventional clock recovery solutions implemented in receivers, for example 4-PAM (pulse amplitude modulation) receivers and like high-speed optical data receivers, require complex front-end architectures that occupy significant amounts of area within receiver chips and that consume significant amounts of power.

Figure 1B:
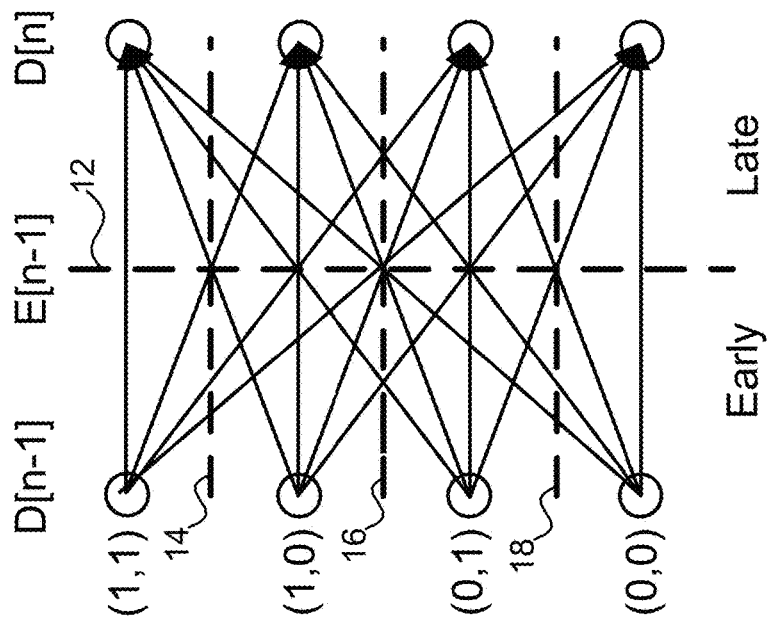
FIGS. 1a and 1b respectively represent transitions between binary and quaternary symbols received at a receiver.
Figure 1A:
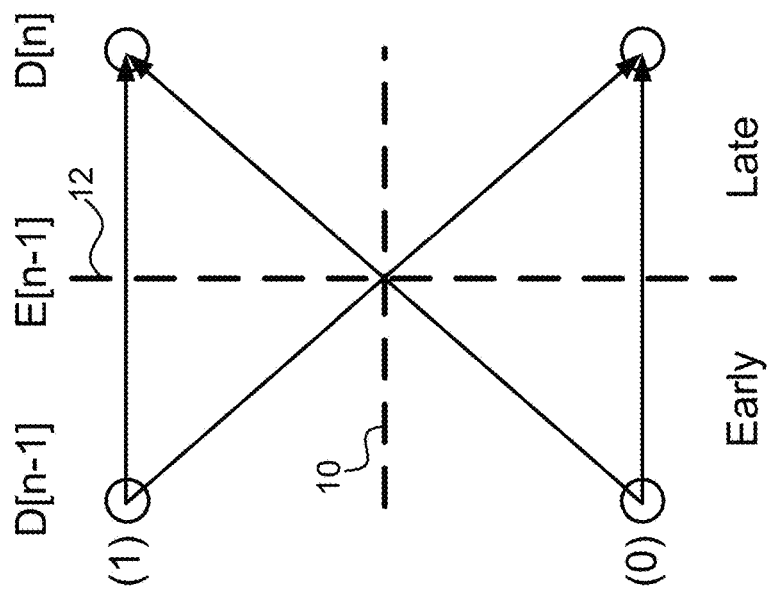

Referring now to the drawings, FIGS. 1a and 1b respectively represent transitions between binary and quaternary symbols received at a receiver. On FIG. 1a, data samples at times (n−1) and (n), identified as "D[n−1]" and "D[n]" can have logical values 0 or 1. A time delay between D[n−1] and D[n] is called a unit interval (UI) and the data samples D[n−1] and D[n] are most easily detected at the center of corresponding UIs. Between the time (n−1) and the time (n), the logical values of the data samples may remain unchanged or may vary from 0 to 1 or from 1 to 0. These changes in the values of the data samples are perceived at the receiver as physical transitions (i.e. electrical or optical) that the receiver may use for clock recovery purposes. Without limitation and for illustration purposes, a data sample having a logical value of 1 may be represented by a symbol voltage of +3 volts and a data sample having a logical value of 0 may be represented by a symbol voltage of −3 volts. If D[n−1] is a logical 1 and D[n] is a logical 0, the symbol voltage passes through a 0-volt threshold 10 between D[n−1] and D[n]. Assuming that D[n−1] and D[n] are received without any time jitter or other distortion, transitions pass through the 0-volt threshold at an ideal time 12, which is a time of an ideal transition time at an edge between consecutive UIs. Between each data sample, the receiver detects an edge sample E[n−1] according to an internal clock and uses these edge sample E[n−1] to align the internal clock (hereinafter a "recovered clock") with a clock that is inherently present in a signal carrying the successive data samples D[n−1] and D[n] (hereinafter a "signal clock"). Once the recovered clock is synchronized with the signal clock, the receiver can optimally detect the data samples D[n−1] and D[n].

If D[n] is the same as D[n−1], there is no voltage change or other physical transition useable at the receiver for clock recovery purposes. Assuming an equal probability that each successive data sample is a logical 1 or 0, transition density of the binary stream of FIG. 1a is 50%.

On FIG. 1b, data samples D[n−1] and D[n] each carry two (2) bits, as in the case for example of a 4-PAM signal. Without limitation and for illustration purposes, a data sample having a logical value of (1,1) may be represented by a symbol voltage of +3 volts, a data sample having a logical value of (1,0) may be represented by a symbol voltage of +1 volt, data samples having logical value of (0,1) and (0,0) being respectively represented by symbol voltages of −1 volt and −3 volts. Transition density is 75% in the sense that D[n] differs in value from D[n−1] 75% of the times, assuming an even probability density of the symbol values. However, among those 75% transitions, the receiver can only use some of them for clock recovery.

For clock recovery purposes, the receiver sampling voltages in the middle of the UI, at the ideal time 12, can only discriminate voltages at one of three (3) thresholds, i.e. a high threshold 14 of +2 volts, a middle threshold 16 of 0 volt, and a low threshold 18 of −2 volts. In the case, for example, of a transition between D[n−1] equal to (1,1) and D[n] equal to (0,1), the voltage at the ideal time 12 is about +1 volt, which is not close to any one of the thresholds 14, 16 and 18. Comparing that +1 volt value to the thresholds 14, 16 and 18 at the ideal time 12 provides no information on a phase alignment between the recovered clock and the signal clock.

For those reasons, the only transitions that the receiver may use for clock recovery those shown in Table I.

TABLE I

| D[n − 1] | D[n] |
|---|---|
| (0,0) | (0,1) |
| (0,0) | (1,1) |

TABLE I-continued

| D[n − 1] | D[n] |
|---|---|
| (0,1) | (0,0) |
| (0,1) | (1,0) |
| (1,0) | (0,1) |
| (1,0) | (1,1) |
| (1,1) | (0,0) |
| (1,1) | (1,0) |

Hence, although the transition density is 75% when quaternary symbols are used, the density of transitions that the receiver may use for clock recovery is only 50% because only those transitions identified in Table I substantially at one of the thresholds 14, 16 or 18 at the ideal time 12. The clock recovery bandwidth is the same for in the case of the binary symbols of FIG. 1a and quaternary symbols of FIG. 1b when the receiver uses three (3) voltage thresholds.

The transition between consecutive UIs as shown on FIG. 1b assumes an ideal phase alignment of a recovered clock with the signal clock. If the recovered clock is early or late, symbol voltages of the data samples D[n−1] and D[n] are not evaluated at the center of the UIs and errors may occur in the decoding of the data samples. For that reason, the receiver attempts to properly and rapidly align the recovered clock with the signal clock of the received 4-PAM signal.

FIG. 2a is a block diagram representing a transmitter 20 and a receiver 50 communicating through a channel 40. FIG. 2b is a block diagram of a clock data recovery (CDR) module implemented in the receiver of FIG. 2a. Not all elements of the transmitter 20 and receiver 50 are shown; FIGS. 2a and 2b are simplified to mainly illustrate elements of the receiver 50 that are used for clock recovery. The transmitter 20 receives an N-phase data signal 22, in which a number of phases N may be 1, 2, 4, and the like. The transmitter 20 converts the N-phase data signal 22 into a single-phase, analog data signal 24 for transmission over the channel 40. The channel 40 delivers an analog data signal 42 to the receiver 50 that converts again the analog data signal 42 into an N-phase data signal 52.

The transmitter 20 comprises a phase locked loop (PLL) 26 connected to a buffer 28. An output 30 of the buffer 28 provides timing to a parallel to serial (P2S) converter 32 that converts the N-phase data signal 22 to a single phase data signal 34. The data signal 34 is converted into analog form by a digital to analog (DAC) converter 36, which places the analog data 24 on the channel 40. The channel 40, for example a cable or a printed circuit board trace, adds intersymbol interference (ISI) and random phase jitter to the analog data signal 24, resulting in an analog data signal 42 received at the receiver 50.

The receiver 50 includes an analog front-end (AFE) 54, a serial to parallel (S2P) converter module 56, and a clock data recovery (CDR) module 58. The analog data signal 42 is received at the AFE 54. In optical data communication applications, the analog data signal 42 is converted to an electrical signal by the AFE 54. The AFE 54 may include an equalizer (not shown), for example a continuous time linear equalizer (CTLE), that mitigates at least some of the distortion that may be introduced in the analog data signal 42 by the channel 40. An output $AFE_{OUT}$ 62 of the AFE 54 is applied to the S2P converter module 56 whose functions are described in detail herein below.

In an implementation, the CDR module 58 comprises a phase detection (PD) logic module 802, a loop filter 804, and a clock phase adjustment module 806. A loop is formed between the S2P converters 56 and components of the CDR 58 to form a recursive clock recovery device that attempts to synchronize recovered clock signals from the CDR module 58 with a signal clock of the analog data signal 42. These recovered clock signals include a data clock (Clk$_D$) and an edge clock (Clk$_E$) that are output from the phase interpolator 808. The S2P converter module 56 includes a number of edge latches and data latches (shown on later Figures) that use timing information provided by the clock signals Clk$_D$ and Clk$_E$ to detect transitions between successive data samples of the analog data signal 42, such as D[n−1] and D[n].

In the S2P converter module 56, the data latches provide most significant and least significant bits based on symbol voltages determined at the center of each UI. These outputs are referred to as D$_{MSB}$ and D$_{LSB}$ (data, most and least significant bits) that the receiver 50 uses to recover each data sample D[n] as a pair of bits (D$_{MSB}$, D$_{LSB}$). The edge latches provide most significant and least significant bits based on symbol voltages determined at the edges of each UI, ideally at the time 12 corresponding to the middle of transitions between successive data samples D[n−1] and D[n]. These outputs are referred to as E$_{MSB}$ and E$_{LSB}$ (edge, most and least significant bits) that the receiver 50 uses to recover each edge sample E[n−1] as a pair of bits (E$_{MSB}$, E$_{LSB}$). Referring again to FIG. 1b and to its description, the receiver 50 can discriminate symbol voltages at the symbol edges when these voltages are near (just above or just below) one of three (3) thresholds 14, 16 and 18, which are respectively set at +2, 0 and −2 volts in an implementation. In an implementation, the S2P converter module 56 groups the outputs D$_{MSB}$, D$_{LSB}$, E$_{MSB}$ and E$_{LSB}$ into words, for example 32-bit words.

The values D$_{MSB}$, D$_{LSB}$, E$_{MSB}$ and E$_{LSB}$ are applied as inputs to the PD logic module 802 of the CDR module 58. D$_{MSB}$ and D$_{LSB}$ are used to recover information received from the transmitter 20. The PD logic module 802 uses the values D$_{MSB}$, D$_{LSB}$, E$_{MSB}$ and E$_{LSB}$ to determine a phase (i.e. time position) of the recovered clock (Clk$_D$, Clk$_E$) in relation to the signal clock of the received analog data signal 42. From a given D$_{MSB}$, D$_{LSB}$ pair provided by the S2P converter module 56, the PD logic module 802 is informed that a given D[n−1] represents one of (1,1), (1,0), (0,1) or (0,0) or, equivalently, that the symbol voltage is +3, +1, −1 or −3 volts. The PD logic module 802 notes a value of a next D[n] in the same fashion. The PD logic module 802 is also informed that an edge sample E[n−1] detected between D[n−1] and D[n] is greater than the high threshold 14 of +2 volts (E$_{MSB}$ is 1 and E$_{LSB}$ is 1, E[n−1] is 3), between the high threshold 14 and the middle threshold 16 of 0 volt (E$_{MSB}$ is 1 and E$_{LSB}$ is 0, E[n−1] is 2), between the middle threshold 16 and the low threshold 18 of −2 volts (E$_{MSB}$ is 0 and E$_{LSB}$ is 1, E[n−1] is 1), or lower than the low threshold 18 (E$_{MSB}$ is 0 and E$_{LSB}$ is 0, E[n−1] is 0).

Several combinations of D$_{MSB}$, and D$_{LSB}$ are not used by the PD logic module for clock recovery. The unused transitions are illustrated in Table II.

TABLE II

| D[n − 1] | D[n] |
|---|---|
| (0,0) | (0,0) |
| (0,0) | (1,0) |
| (0,1) | (0,1) |
| (0,1) | (1,1) |
| (1,0) | (0,0) |
| (1,0) | (1,0) |

TABLE II-continued

| D[n − 1] | D[n] |
|---|---|
| (1,1) | (0,1) |
| (1,1) | (1,1) |

Other combinations between D[n−1] and D[n] used along with E[n−1] may lead to determinations that the recovered clock is early, or late, as shown on Table III.

TABLE III

| D[n − 1] | D[n] | E[n − 1] | Clock phase |
|---|---|---|---|
| (0,0) | (0,1) | 0 | Early |
|  |  | 1 | Late |
| (0,0) | (1,1) | 0 or 1 | Early |
|  |  | 2 or 3 | Late |
| (0,1) | (0,0) | 1 | Early |
|  |  | 0 | Late |
| (0,1) | (1,0) | 1 | Early |
|  |  | 2 | Late |
| (1,0) | (0,1) | 2 | Early |
|  |  | 1 | Late |
| (1,0) | (1,1) | 2 | Early |
|  |  | 3 | Late |
| (1,1) | (0,0) | 3 or 2 | Early |
|  |  | 1 or 0 | Late |
| (1,1) | (1,0) | 3 | Early |
|  |  | 2 | Late |

Considering for example the transition from D[n−1] representing (0,0) to D[n] representing (0,1), referring to FIG. 1b and assuming a perfect timing of the voltage measurement and an ideal synchronization of the recovered clock with the signal clock of the analog data signal 42, the voltage should be equal to the low voltage threshold 18, which is −2 volts. In practice, the measured voltage will most frequently be somewhat higher or lower than the low voltage threshold 18. If the voltage is less than the low voltage threshold 18 (i.e. less than −2 volts), the edge sample E[n−1] is set to zero. This indicates that the recovered clock is at least slightly early in relation to the ideal time 12. The opposite is also true, in that if the voltage exceeds the low voltage threshold 18, E[n−1] is set to one, indicating that the recovered clock is at least slightly late in relation to the ideal time 12.

Some E[n−1] values are not shown on Table III. For example E[n−1] set to 2 or 3 is not expected to occur when D[n−1] and D[n] are respectively set to (0,0) and (0,1), unless a strong transient error voltage is present in the signal applied at the 4-PAM receiver when sampling E[n−1]. The PD logic module 802 may simply ignore such combinations.

Based on Table III, the PD logic module 802 continuously evaluates whether the clock signals Clk$_D$ and Clk$_E$ from the clock phase adjustment module 806 are either early or late based on successive D$_{MSB}$, D$_{LSB}$, E$_{MSB}$ and E$_{LSB}$ values. The PD logic module 802 uses a simple, conventional algorithm to output successive phase error indications 810 that are applied to the loop filter 804. As an example, the PD logic module 802 may output a negative or positive indication phase error indication 810 when the clock signals from the phase interpolator 808 are, respectively, early or late, as determined based on the information obtained from the S2P converter module 56 in a last UI. Alternatively, the PD logic module 802 may base each phase error indication 810 on information obtained from the S2P converter module 56 over a predetermined number of UIs.

Phase jitter and wander that may be introduced in the analog data signal 42 by the channel 40 are expected to cause the PD logic module 802 to alternate between "early" and "late" phase error indications 810. In the loop filter 804, the successive phase error indications 810 are filtered to provide a long-term determination of the phase of the recovered clock. The loop filter 804 outputs a clock phase control signal 812 that is received at the clock phase adjustment module 806. FIG. 2b illustrates two (2) alternative implementations of the clock phase adjustment module 806. In one implementation, the clock phase adjustment module 806 includes clock generator comprising a PLL 818 coupled to a buffer 820. The clock generator creates a base clock signal 816 applied to a phase interpolator 808. The phase interpolator 808 is adapted to modify the phase of the base clock signal 816 to generate a recovered clock. In another implementation, the clock phase adjustment module 806 includes an oscillator, for example a voltage controlled oscillator or a digitally controlled oscillator (VCO/DCO) 814. Depending on the implementation, the clock phase control signal 812 is applied to the phase interpolator 808 or to the VCO/DCO 814 that generates the edge clock signal ($Clk_E$) and the data clock signal ($Clk_D$). The $Clk_E$ and $Clk_D$ are respectively applied to the edge latches and the data latches of the S2P converter module 56 for outputting the $E_{MSB}$, $E_{LSB}$, $D_{MSB}$ and $D_{LSB}$.

The $Clk_D$ and the $Clk_E$ are either recovered from the signal clock, or currently being recovered from the signal clock. The $Clk_D$ and the $Clk_E$ share the same frequency and are separated by a phase difference so that the $Clk_D$ is intended to be aligned with the data samples D[n−1] and D[n] while the $Clk_E$ is intended to be centered on edges between successive data samples. The $Clk_D$ may also be understood as a "data clock signal" because it is used to evaluate values of the data samples D[n−1] and D[n]. In the present disclosure, the term "recovered clock" is used interchangeably with the terms $Clk_D$ and $Clk_E$.

Figure 3:
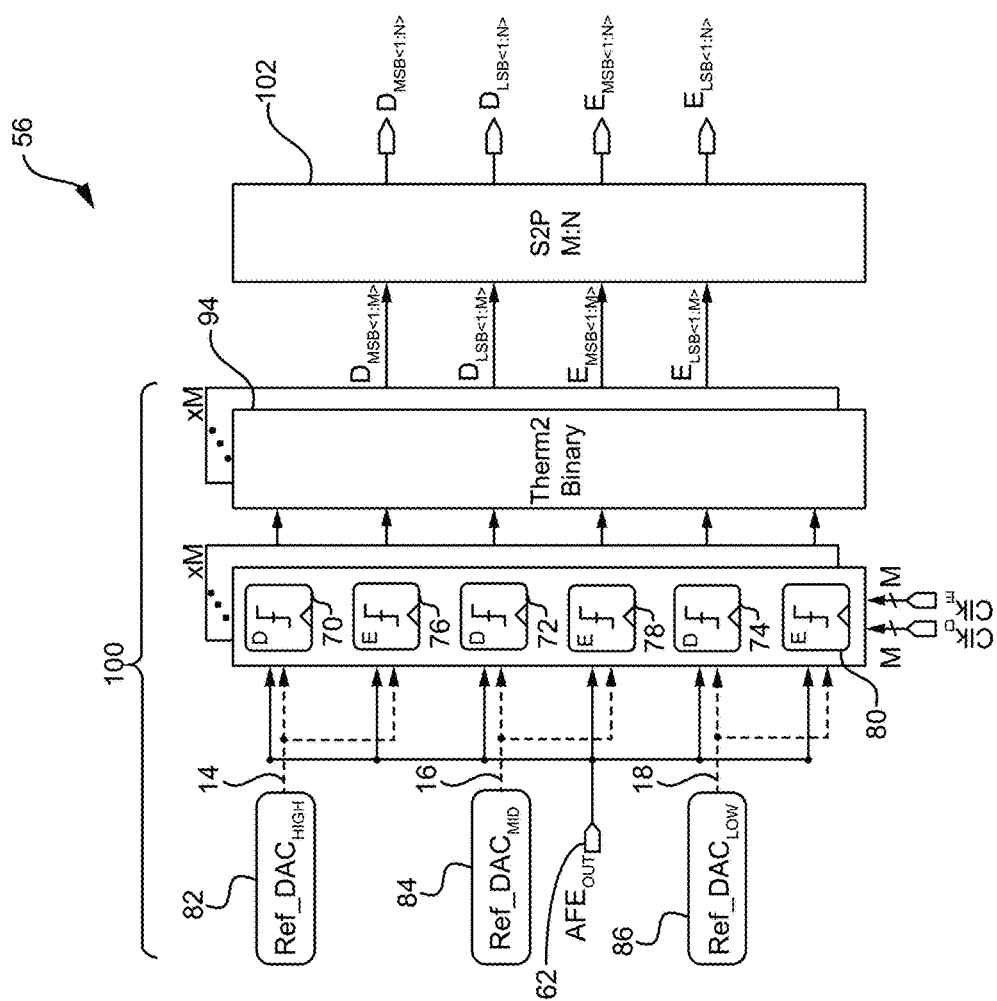
FIG. 3 is a block diagram of serial to parallel (S2P) converters of a 4-PAM receiver according to an implementation.

FIG. 3 is a block diagram of serial to parallel (S2P) converters of a 4-PAM receiver 50 according to an implementation. The S2P converter module 56 includes a 1:M S2P converter 100 in which "M" represents an operating rate of the receiver 50. In a non-limiting example, the receiver 50 may be operating at quarter-rate (M=4). The S2P converter module 56 also includes a M:N S2P converter 102 that outputs each of the $D_{MSB}$, $D_{LSB}$, $E_{MSB}$ and $E_{LSB}$ in groups of N symbols corresponding to N successive UIs.

The $Clk_D$ and the $Clk_E$ have M phases, for example four (4) phases in a quarter-rate implementation of the receiver 50. In the non-limiting case of a 4-PAM receiver in which each symbol D[n] represents two (2) bits, three (3) voltage thresholds are used to determine the value of the symbol. Consequently, the 1:M S2P converter 100 includes three (3) groups of M data latches and three (3) groups of M edge latches. In a quarter-rate implementation, four (4) data latches 70 are used to determine if the $AFE_{OUT}$ 62 applied at the S2P converter module 56 has a higher voltage than the high threshold 14 at the center of four (4) successive UIs. Four (4) data latches 72 are used to determine if the $AFE_{OUT}$ 62 has a higher voltage than the middle threshold 16 at the center of these four (4) successive UIs. Four (4) data latches 74 are used to determine if the $AFE_{OUT}$ 62 has a higher voltage than the low threshold 18 at the center of these four (4) successive UIs. In each group of four (4) data latches, a first data latch is driven by a first phase of the $Clk_D$, a second data latch is driven by a second phase of the $Clk_D$, and so on.

In an equivalent manner, M edge latches 76 are used to determine if the $AFE_{OUT}$ 62 has a higher voltage than the high threshold 14 M successive edges, M edge latches 78 being used to determine if the $AFE_{OUT}$ 62 has a higher voltage than the middle threshold 16 at these M successive edges, and M edge latches 80 being used to determine if the $AFE_{OUT}$ 62 has a higher voltage than the low threshold 18 at these our (4) successive edges. In each group of M edge latches, a first edge latch is driven by a first phase of the $Clk_E$, a second edge latch is driven by a second phase of the $Clk_E$, and so on.

In an implementation operating at full rate (M=1), one edge latch and one data latch would be required for each of the three (3) thresholds identified in the discussion of FIG. 1b, the edge latches responding to the $Clk_E$ and the data latches responding to the $Clk_D$.

Reference modules 82, 84 and 86 respectively provide high, middle and low reference voltages 14, 16 and 18 to the data and edge latches, for example +2, 0 and −2 volts as in the case of the foregoing description of FIG. 1b. The high reference voltage 14 from the reference module 82 is applied to the four (4) data latches 70 and to the four (4) edge latches 76. Likewise, the middle reference voltage 16 from the reference module 84 and the low reference voltage 18 from the reference module 86 are respectively applied to the four (4) data latches 72 and 74 and to the four (4) edge latches 74 and 80.

At each rising edge of a corresponding phase of the $Clk_E$ (or at each falling edge, in an alternate implementation), one of the edge latches 76 corresponding to the current phase of the $Clk_E$ outputs a logical 1 if the voltage of the $AFE_{OUT}$ 62 is greater than the high reference voltage 14, and outputs a logical 0 otherwise. At the same time, one the edge latches 78 output a logical 1 if the voltage of the $AFE_{OUT}$ 62 is greater than the middle reference voltage 16, and outputs a logical 0 otherwise, one the edge latches 80 outputting a logical 1 if the voltage of the $AFE_{OUT}$ 62 is greater than the low reference voltage 18, or outputting a logical 0 otherwise. These outputs are applied to M thermometer to binary converters 94 (also called unary to binary converters). The 1:M S2P converter 100 may be considered as a flash analog-to-digital converter, that issues, at each phase of the $Clk_E$, values of the most and least significant bits $E_{MSB}$ and $E_{LSB}$ that together form a value of the edge sample E[n−1] for that each phase of the $Clk_E$.

In an equivalent manner, at each rising edge of a corresponding phase of the $Clk_D$ (or at each falling edge, in an alternate implementation), one of the data latches 70 corresponding to the current phase of the $Clk_D$ outputs a logical 1 if the voltage of the $AFE_{OUT}$ 62 is greater than the high reference voltage 14, and outputs a logical 0 otherwise. At the same time, one of the data latches 72 outputs a logical 1 if the voltage of the $AFE_{OUT}$ 62 is greater than the middle reference voltage 16, and outputs a logical 0 otherwise, one of the data latches 74 outputting a logical 1 if the voltage of the $AFE_{OUT}$ 62 is greater than the low reference voltage 18, or outputting a logical 0 otherwise. These outputs are applied to the thermometer to binary converter 94 that issues, at each phase of the $Clk_D$, values of the most and least significant bits $D_{MSB}$ and $D_{LSB}$ that together form a value of the data sample D[n−1] or D[n] for that each phase of the $Clk_D$.

In the implementation as shown on FIG. 3, successive values $E_{MSB}$, $E_{LSB}$, $D_{MSB}$ and $D_{LSB}$ are applied to the M:N S2P converter 102 prior to being applied to the CDR module 60. In a non-limiting example, the M:N S2P converter 102 combines these inputs into 32-bit words (N=32).

In an alternate implementation, the $D_{MSB}$, $D_{LSB}$, $E_{MSB}$ and $E_{LSB}$ values may be combined in larger or smaller words by the M:N S2P converter 102, or may transferred as single bits directly from the thermometer to binary converter 94 to the CDR module 60. Use of 32-bit words allows the CDR module 60 to operate at a much slower rate than the data rate of the analog data signal 42.

Figure 4:
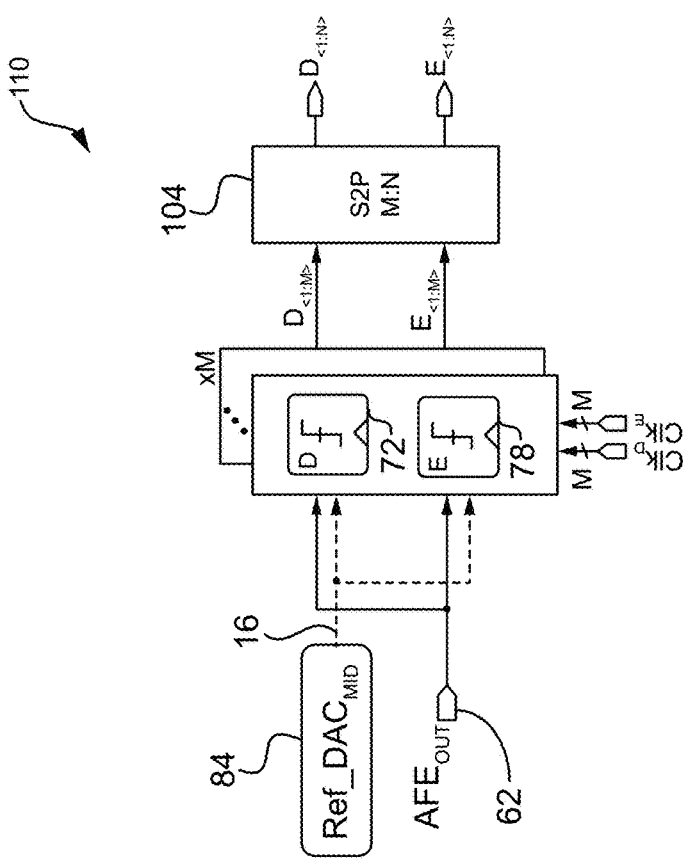
FIG. 4 is a block diagram of serial to parallel (S2P) converters of a NRZ receiver according to an implementation.

For comparison purposes, FIG. 4 is a block diagram of serial to parallel (S2P) converters of a NRZ receiver according to an implementation. An S2P converter module 110 is much simpler than S2P converter module 56 of FIG. 3, having a single group of M edge latches 78 and a single group of M data latches 72, along with a single reference module 84. Because there is no need to combine outputs of distinct groups of latches using distinct reference levels, there is no thermometer to binary converter. An M:N S2P converter 104 is simpler than the M:N S2P converter 102 of FIG. 3 because it only needs to combine one (1) bit per data symbol D and one (1) bit per edge E to form N-symbol words.

Many components of the AFE 54, S2P converter module 56 and S2P converter module 110 of FIGS. 2, 3 and 4 are analog components that consume power and occupy significant physical space in the receiver 50. For example, the $AFE_{OUT}$ 62 is received at the S2P converter module 56 of FIG. 3 in the form of voltage applied at each of the edge and data latches. The AFE 54 therefore needs to drive a total of 24 latches in the case of a quarter-rate implementation (M=4).

The present disclosure modifies the manner in which the PD logic module 802 determines whether the phase of the edge clock signal ($Clk_E$) is early or late in relation to the signal clock. It will be noted that the edge clock signal $Clk_E$ is shifted in phase from the data clock signal $Clk_D$, these clocks $Clk_D$ and $Clk_E$ being otherwise synchronized. This modification implemented in the PD logic module 802 allows reducing the number of latches and related components in a modified S2P converter module of a 4-PAM receiver, as will be shown hereinbelow. In an implementation, the modified S2P converter module may use a different subset of the edge samples E[n−1] when compared to the content of Table III. Only one (1) voltage threshold is used, whereby the edge samples E[n−1] are represented by a single bit (logical values 0 or 1). The PD logic module 802 may use the data samples D[n−1]D[n] and the edge samples E[n−1] to detect very early and very late transitions, in addition to detecting early and late transitions, and apply different weights to different data transitions.

Figure 5B:
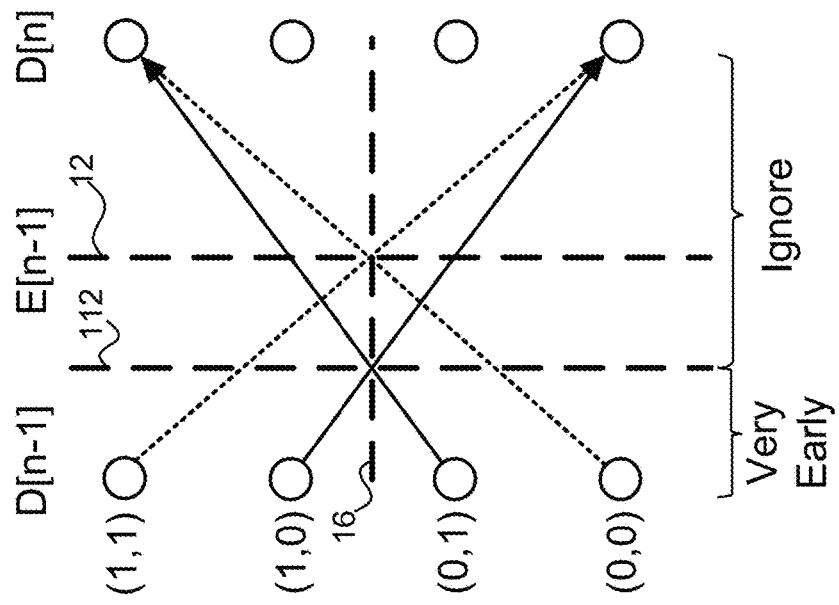
FIGS. 5a and 5b represent different subsets of possible transitions between quaternary symbols.
Figure 5A:
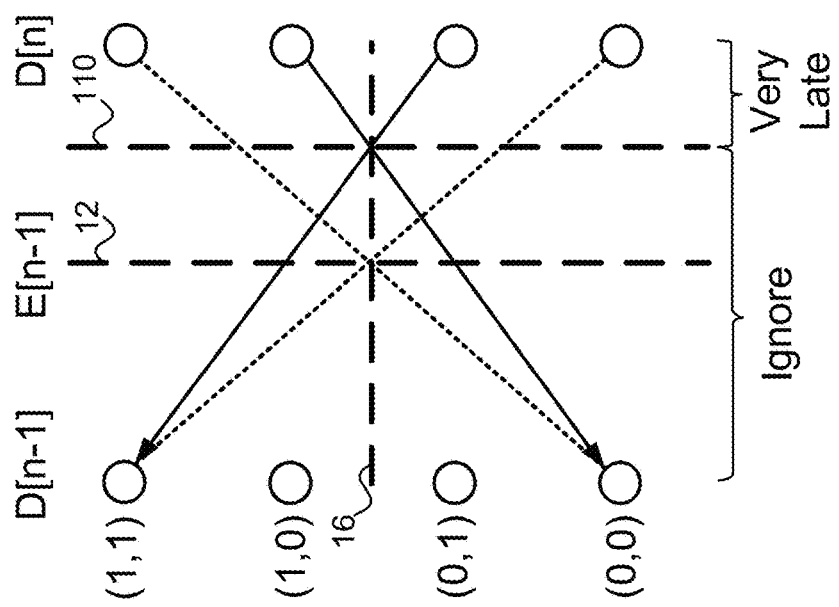

FIGS. 5a and 5b represent different subsets of possible transitions between quaternary symbols. Some, but not all of the transitions of FIG. 1b are reproduced in FIGS. 5a and 5b. While the high, middle and low voltage thresholds 14, 16 and 18 are still used to determine data samples D[n−1] and D[n], only the middle voltage threshold 16 of 0 volt, is shown on FIGS. 5a and 5b to illustrate sampling of the analog data signal 42 in view of determining the edge sample E[n−1] in an implementation. Because the voltage sampled at is either above or below the middle threshold 16, the edge sample E[n−1] is encoded with a single bit. It may be observed that, in essence, a latch can only indicate if a voltage is higher than or lower than a threshold and cannot indicate that a voltage is equal to a threshold.

Transitions that are used in the context of FIG. 5b in the same manner as used in the context of earlier Figures are illustrated in dotted lines on FIGS. 5a and 5b. As in the case of FIG. 1b, if for example D[n−1] is (0,0) and D[n] is (1,1), the symbol voltage at the ideal time 12 should substantially be at 0 volt, at or near the middle threshold 16. If the voltage is higher than the middle threshold 16, E[n−1] is set to 1, indicating that the recovered clock is late. If, on the other hand the voltage is lower than the 0-volt threshold 16, E[n−1] is set to 0, indicating that the recovered clock is early. These values of E[n−1] only indicate whether the recovered clock is early or late, without providing an indication of the magnitude of a phase error of the recovered clock.

Other transitions illustrated in solid lines on FIGS. 5a and 5b were not used in the context of earlier Figures. Considering for example the transition when D[n−1] is (0,0) and D[n] is (1,0) on FIG. 5a, the symbol voltage as it transits between these two data samples is less than the middle threshold of 0 volt for most of the duration of the UI between D[n−1] and D[n]. Sampling E[n−1] near the ideal time 12 could not indicate if the recovered clock is early or late. If however, the symbol voltage is greater than the middle threshold of 0 volt at the sampling time after dashed line 110 (E[n−1] is 1), sampling takes place a long time after the ideal time 12, which implies that the recovered clock is very late. In the same manner, considering the transition when D[n−1] is (0,1) and D[n] is (1,1) on FIG. 5b, the symbol voltage as it transits between these two data samples is greater than the middle threshold 16 of 0 volt for most of the duration of the UI between D[n−1] and D[n]. Sampling E[n−1] near the ideal time 12 could also not indicate if the recovered clock is early or late. If however, the symbol voltage is less than the middle threshold 16 of 0 volt at the sampling time before dashed line 112 (E[n−1] is 0), sampling takes place a long time before the ideal time 12, which implies that the recovered clock is very early.

A mapping table summarizes combinations between D[n−1], D[n] and E[n−1] values from the modified S2P converter module that the PD logic module 802 may use, in an implementation, to classify edge transitions in view to determine a phase (i.e. time position) of the recovered clock in relation to the received analog data signal 42. Table IV illustrates a content of the mapping table. Table IV also provides non-limiting examples of weights that may be applied in the PD logic module 802 for determining successive phase error indications 808 to be applied to the loop filter 804.

TABLE IV

| D[n − 1] | D[n] | E[n − 1] | Edge Transition Class | Weight |
|---|---|---|---|---|
| (0,0) | (1,0) | 0 | Unknown | 0 |
|  |  | 1 | Very late | +4 |
| (0,0) | (1,1) | 0 | Early | −1 |
|  |  | 1 | Late | +1 |
| (0,1) | (1,1) | 0 | Very early | −4 |
|  |  | 1 | Unknown | 0 |
| (1,0) | (0,0) | 0 | Unknown | 0 |
|  |  | 1 | Very early | −4 |
| (1,1) | (0,0) | 0 | Late | +1 |
|  |  | 1 | Early | −1 |
| (1,1) | (0,1) | 0 | Very late | +4 |
|  |  | 1 | Unknown | 0 |

The PD logic module 802 classifies the edge transitions that can be determined, not being marked as "Unknown" in the mapping table, and assigns a corresponding weight to those known edge transitions. The PD logic module 802 may determine the phase error indication 54 based on a combination of those weights.

In a non-limiting example, the PD logic module 802 implements a majority voting function to combine a number of successive edge transitions into a phase error indication 56. In an implementation, the PD logic module considers N successive edge transitions, for example N=32. If the number of late detections exceeds the number of early detections, the phase error indication 808 is set to +1. If the number of early detections exceeds the number of late detections, the phase error indication 808 is set to −1. If the number of very late detections exceeds the number of very early detections, the phase error indication 808 is set to +4. If the number of very early detections exceeds the number of very late detections, the phase error indication 808 is set to −4. The phase error indication 808 is set to a neutral value, for example 0, if the numbers of early and very early detections cancel out the numbers of late and very late detections.

In another non-limiting example, the PD logic module 802 implements a summing function to combine a number of successive edge transitions into a phase error indication 56. In an implementation, the PD logic module sums the weights assigned to eight (8) successive edge transitions. A result of this summation may be in a range between −32 if there are eight (8) very early detections and +32 if there are eight (8) very late detections, the result of this summation being closer to zero (0) when the recovered clock is substantially synchronized with the signal clock. Averaging may be obtained by dividing this summation by a predetermined averaging factor, for example 2, 4 or 8. A result of this averaging function is the phase error indication 808 output by the PD module 54. This averaging function allows expressing each phase error indication 808 using a limited number of bits. In an implementation, depending on an available bandwidth between the PD logic module 802 and the loop filter 804, the phase error indication 808 may be equal to the sum of the weights assigned to eight (8) successive edge transitions.

In these examples, the phase error indication 808 has a negative value when edge transitions generally tend to be early in relation to the signal clock. Early edge transitions indicate that the generated edge clock signal ($Clk_E$) and the generated data clock signal ($Clk_D$) should be delayed in order to better track the signal clock. The opposite is true in that the phase error indication 808 has a positive value when the phases of the generated clock signals $Clk_E$ and $Clk_D$ are behind the signal clock and need to be advanced for proper clock recovery.

In the above examples, the majority voting function and the summing and/or averaging functions assign +4 and −4 weights to very late and very early detections, respectively, and +1 and −1 weights to late and early detections, respectively. Other weighting values are contemplated. Use of positive weights when the clock phase is early or very early, along with the use of negative weights when the clock phase is late or very late, is also contemplated; the loop filter 804 is configured to generate the proper clock phase control signal 812 based on the sign of the weights assigned to early and late detections.

It may be observed that conventional algorithms as described hereinabove may be understood as not using any weight in the calculation of the phase error indications 808. Such conventional algorithms may alternatively be understood as using weights of a same magnitude for all early or late detections, with positive or negative signs as applicable.

Figure 6:
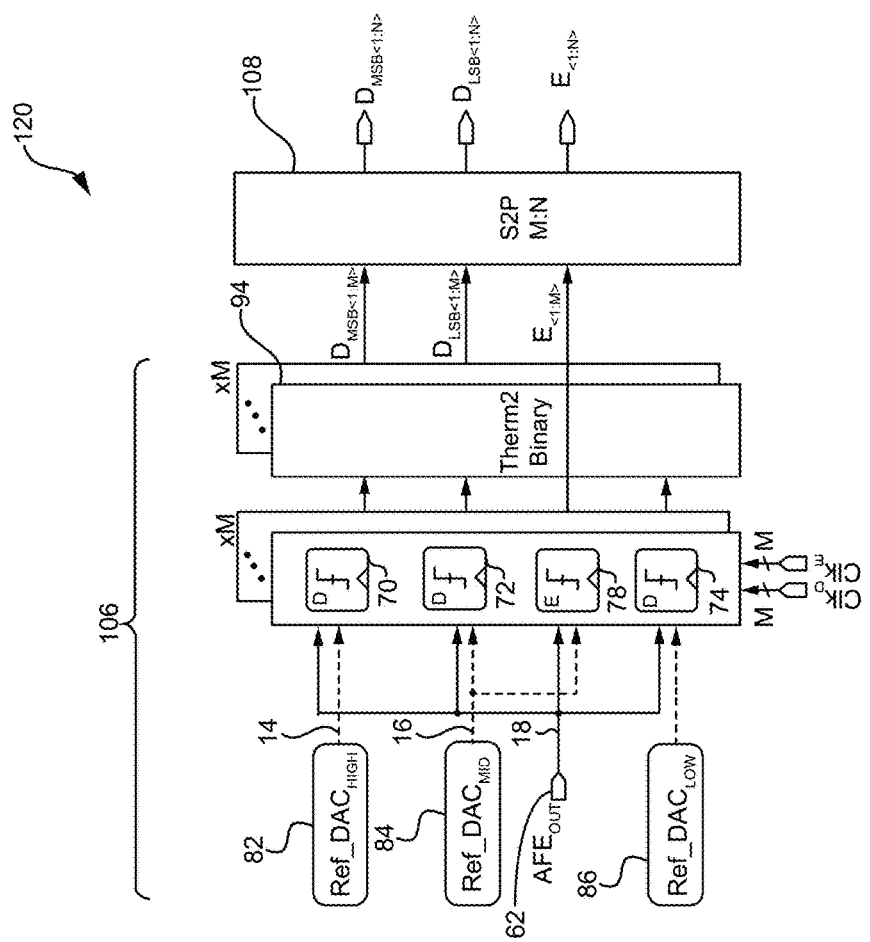
FIG. 6 is a block diagram of serial to parallel (S2P) converters of a 4-PAM receiver according to another implementation.

FIG. 6 is a block diagram of serial to parallel (S2P) converter of a 4-PAM receiver according to another implementation. The implementation of FIG. 6 differs from that of FIG. 3 in the sense that implementation in the PD logic module 802 of a decision-making process based on Table IV allows configuring a modified S2P converter module 120 with a lesser number of edge latches.

Comparing the S2P converter module 120 of FIG. 6 with the S2P converter module 56 of FIG. 3, the S2P converter module 120 comprises a simpler 1:M S2P converter 106 and a simpler M:N S2P converter 108. The 1:M S2P converter 106 includes the same three (3) groups of M data latches 70, 72, 74 receiving the $AFE_{OUT}$ 62 of the AFE 54, the thresholds 14, 16 and 18 from the reference modules 82, 84 and 86, the $Clk_D$. The data latches 70, 72, 74 still apply their outputs to the thermometer to binary converter 94 that in turn outputs the same M consecutive $D_{MSB}/D_{LSB}$ corresponding to the M phases of the $Clk_D$ to provide M successive data samples such as $D_{MSB}/D_{LSB}$ [n−1] or $D_{MSB}/D_{LSB}$ [n]. These components of the S2P converter module 120 operate in the same or equivalent manner as the corresponding components of the S2P converter module 56. The thermometer to binary converter 94 applies its output to the M:N S2P converter.

In contrast, the 1:M S2P converter 106 only includes one group of M edge latches 78 receiving the $AFE_{OUT}$ 62 from the AFE 54, the threshold 16 from the reference module 84 and the $Clk_E$. The M edge latches 76 and the M edge latches 80 of the S2P converter module 56 are not present. At each rising edge of a corresponding phase of the $Clk_E$ (or at each falling edge, in an alternate implementation), one the edge latches 78 outputs a logical 1 if the voltage of the $AFE_{OUT}$ 62 is greater than the middle reference voltage 16, and outputs a logical 0 otherwise. These outputs are binary, labeled "E" on FIG. 6, given that a single edge latch 78 compares the $AFE_{OUT}$ 62 with a single threshold 16, and do not need to be applied to the thermometer to binary converter 94. In fact each successive E is an edge sample E[n−1] that the PD logic module 802 uses to determine the phase of the $Clk_E$. M consecutive E are obtained from the M edge latches 78 and are directly applied to the M:N S2P converter 108. The M:N S2P converter 108 is simpler than the M:N S2P converter 102 of FIG. 3 because it only receives one (1) bit per edge sample, instead of two (2) bits per edge sample in the case of FIG. 3.

Comparing FIGS. 3 and 6, in the specific case of a quarter-rate operation (M=4), the S2P converter module 120 uses only four (4) edge latches 78 instead of 12 edge latches 76, 78, 80, and uses a simpler M:N S2P converter. This provides a significant reduction of the space occupied by the S2P converter module 120 when installed in the receiver 50. The omission in the S2P converter module 120 of some of the components used in the S2P converter module 56 also provides a significant power consumption reduction. Additionally, the AFE 54 and the phase CDR 58 that provides the $Clk_E$ drive fewer edge latches. At the same time the thermometer to binary converter 94 converts fewer outputs from those edge latches 78. As a result, the phase interpolator 808, the AFE 54 and the thermometer to binary converter 94 also consume less power in the implementation as shown on FIG. 6.

While the present technology is illustrated in FIGS. 2 and 6 in the context of a 4-PAM receiver, using three (3) voltage thresholds, the present technology may also be applied for clock recovery in a higher-order receiver. Considering for example an 8-PAM receiver, a number of groups of data latches in an S2P converter module would be increased to detect data samples that each represent three (3) bits. However that S2P converter module would still only use one (1) group of M edge latches to detect edge transitions. The PD logic module 802 would implement a mapping table to detect early, late, very early or very late transitions in view of the edge transitions and in further view of detected data samples from an 8-PAM data signal. It is contemplated that a mapping table of the PD logic module 802 could be adapted to detect early or late transitions at up to three (3)

levels, for instance early or late, more early or more late, and even more early or even more later.

Figure 7:
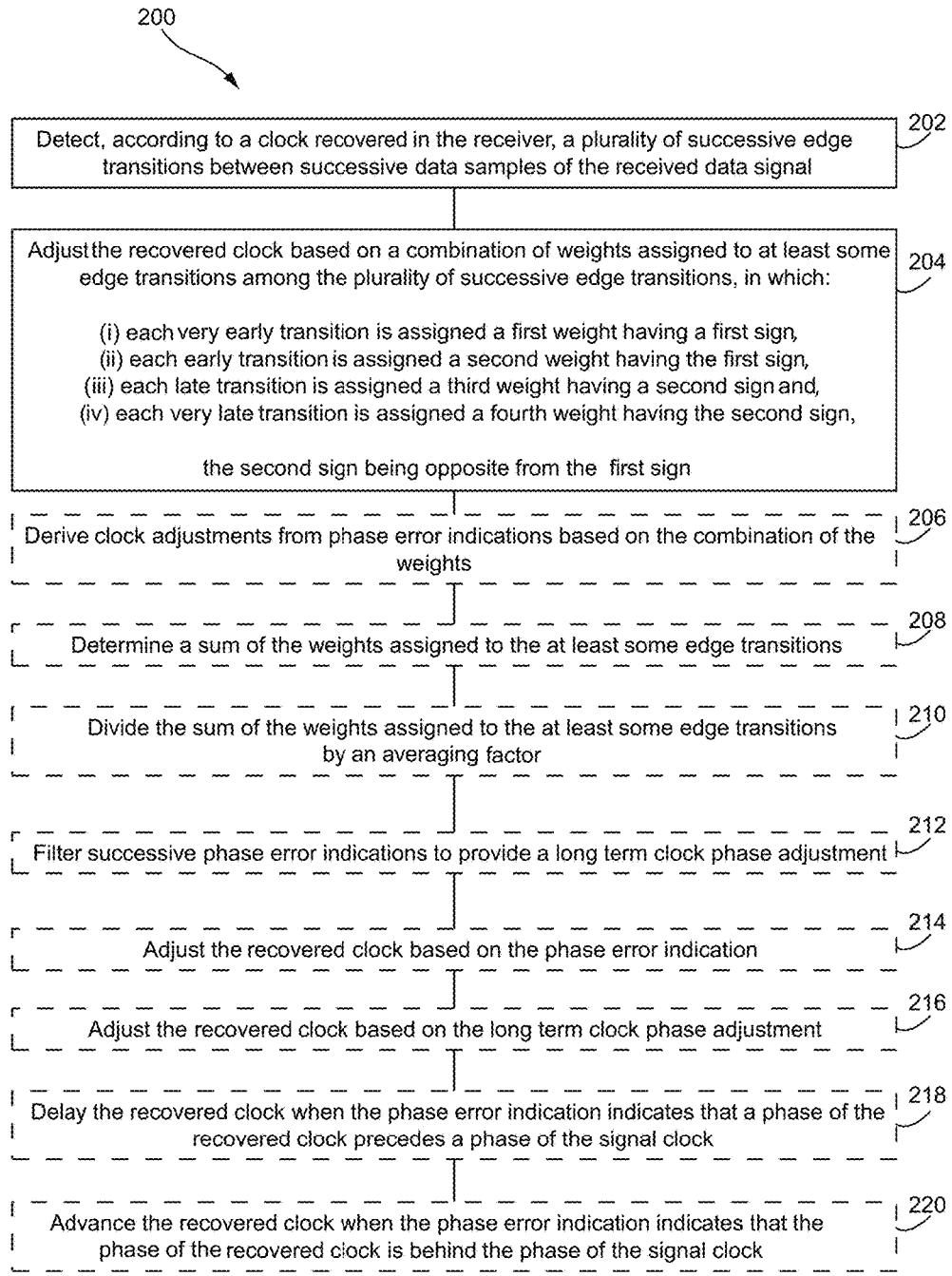
FIG. 7 is a sequence diagram showing operations of a method implemented in a receiver for recovering a signal clock from a received data signal according to an embodiment.

FIG. 7 is a sequence diagram showing operations of a method implemented in a receiver for recovering a signal clock from a received data signal according to an embodiment. On FIG. 7, a sequence 200 comprises a plurality of operations that may be executed in variable order, some of the operations possibly being executed concurrently, some of the operations being optional. Operation 202 comprises detecting a plurality of successive edge transitions between successive data samples of the received analog data signal 42 according to the clock $Clk_E$, in a full rate implementation, or according to M successive phases of the clock $Clk_E$, in an M-rate (for example quarter-rate) implementation. The recovered clock is adjusted at operation 204, based on a combination of weights assigned to at least some edge transitions among the plurality of successive edge transitions. To this end, (i) each very early transition is assigned a first weight having a first sign, (ii) each early transition is assigned a second weight having the first sign, (iii) each late transition is assigned a third weight having a second sign opposite from the first sign, and (iv) each very late transition is assigned a fourth weight having the second sign.

In an implementation, operation 206 comprises deriving clock adjustments from phase error indications based on the combination of the weights. The phase error indication 808 may be set at operation 206 as equal to one of:
- the first weight when a number of very early transitions exceeds a number of very late transitions;
- the fourth weight when the number of very late transitions exceeds the number of very early transitions;
- the second weight when a number of early transitions exceeds a number of late transitions while the number of very early transitions is equal to the number of very late transitions;
- the third weight when the number of late transitions exceeds the number of early transitions while the number of very early transitions is equal to the number of very late transitions;
- a neutral value when the number of late transitions is equal to the number of early transitions while the number of very early transitions is equal to the number of very late transitions.

In another implementation, operation 206 may comprise sub-operation 208 and, optionally, sub-operation 210. Sub-operation 208 comprises determining a sum of the weights assigned to the at least some edge transitions. Sub-operation 210 comprises dividing the sum of the weights assigned to the at least some edge transitions by an averaging factor. The phase error indication 808 may be set equal to the sum of the weights or, alternatively, to the sum of the weights divided by the averaging factor.

Operation 212 may comprise filtering successive phase error indications 808 to provide a long term clock phase adjustment, presented for example as a clock phase control signal 812. The recovered clock is adjusted based on the phase error indication, or based on filtered successive phase error indications, at operation 214. Referring again to FIG. 2b, this operation 214 may be effected in the clock phase adjustment module 806 by the phase interpolator 808 using the clock phase control signal 812 to adjust the base clock signal 816 to generate the edge clock signal ($Clk_E$) and the data clock signal ($Clk_D$). Alternatively, operation 214 may be effected in the clock phase adjustment module 806 by applying the clock phase control signal 812 to the VCO/DCO 814 to control the frequency and phase of the clock signals $Clk_D$ and $Clk_E$.

Operation 214 may include one or more of sub-operations 216, 218 and 220. An implementation that includes operation 212 may further include adjusting the recovered clock $Clk_E$ at sub-operation 216 based on the long term clock phase adjustment. The recovered clock $Clk_E$ is delayed at sub-operation 218 when the phase error indication indicates that a phase of the clock $Clk_E$ precedes a phase of the signal clock. The clock $Clk_E$ is advanced at sub-operation 220 when the phase error indication indicates that the phase of the clock $Clk_E$ or $Clk_E$ is behind the phase of the signal clock.

As expressed hereinabove, the recovered clock comprises an edge clock $Clk_E$ and a data clock $Clk_D$, these clocks being synchronized and being separated by a phase difference.

Operation 202 may comprise detecting a given edge transition among the plurality of successive edge transitions between the successive data samples of the received data signal by determining a first value of the received analog data signal 42 (or a first value of the $AFE_{OUT}$ 62) upon a first transition of the data clock $Clk_D$, determining a second value of the analog data signal 42 upon a transition of the edge clock $Clk_E$ immediately following the first transition of the data clock $Clk_D$, and determining a third value of the received analog data signal 42 upon a second transition of the data clock $Clk_C$ immediately following the transition of the edge clock $Clk_E$. A first data sample is decoded to provide D[n−1] by comparing the first value of the received analog data signal 42 to the high threshold 14, to the middle threshold 16 and to the low threshold 18. Under this decoding, D[n−1] is equal to a first logical value, for example (1,1), if the first value is greater than the high threshold 14, to a second logical value, for example (1,0), if the first value is less than the high threshold 14 and greater than the middle threshold 16, a third logical value, for example (0,1), if the first value is less than the middle threshold 16 and greater than the low threshold 18, and a fourth logical value, for example (0,0), if the first value is less than the low threshold 18. The third value is decoded in the same manner to provide a second data sample D[n]. To evaluate a given edge sample at the given edge transition, the second value of the received analog data signal 42 is compared to the middle threshold 16 to provide E[n−1]. The given edge sample E[n−1] is equal to a fifth logical value, for example (1), if the second value is greater than the middle threshold 16 and equal to a sixth logical value, for example (0), if the second value is less than the middle threshold 18. The given edge transition is then classified at as a part of operation 204 by applying the first, second and third values of the received data signal, expressed as D[n−1] D[n] and E[n−1], to the mapping table illustrated in Table IV, which contains edge transition classes as a function of the first, second and third values of the received data signal. Weights are assigned during operation 204 using the same mapping table.

Figure 8:
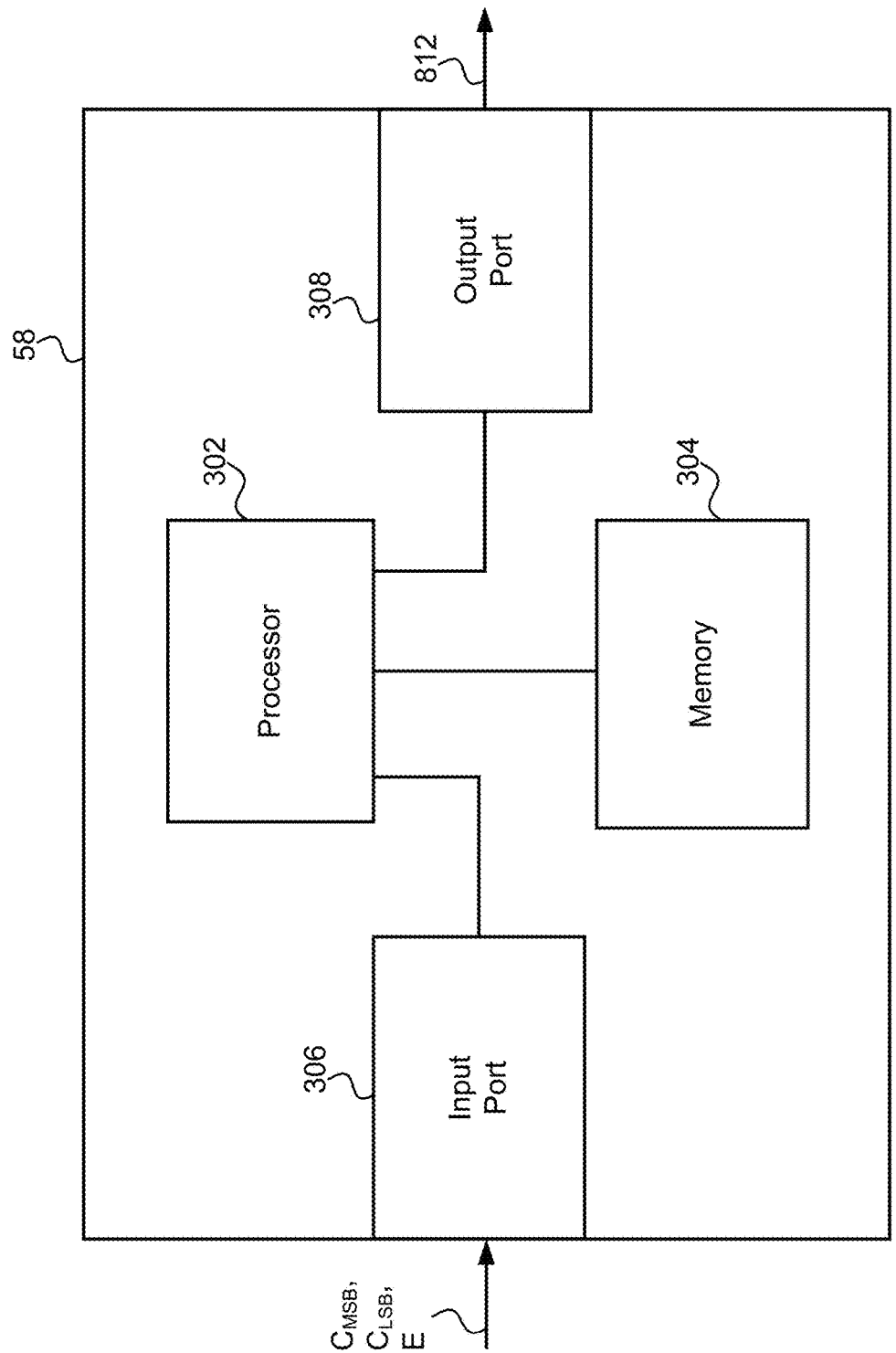
FIG. 8 is a block diagram of a CDR module according to an embodiment.

Each of the operations of the sequence 200 may be implemented using digital logic, using analog circuits or a combination of both. Alternatively, the operations of the sequence 200 may be processed by or under the control of one or more processor, the one or more processors being coupled to a memory. Referring now to FIG. 8, there is shown a block diagram of a CDR 58 according to an embodiment. The CDR 58 comprises a processor 302 operatively connected to a memory 304. The processor 302 may include a plurality of co-processors. The memory 304 may include one or more memory modules. The CDR 58 also includes and input port 306 and an output port 308 that are operatively connected to the processor 302. The input port 306 and the output port 308 may be combined into a single dual port in an implementation.

The values $D_{MSB}$, $D_{LSB}$ and E received at the CDR 58 from the S2P converter module 120 are received at the input port 306 and forwarded to the processor 302 for processing. The values $C_{MSB}$, $C_{LSB}$ and E may be received as single-bit fields or as 32-bit words from the S2P converters 102, 104 and 100, respectively. The processor 302 uses successive edge transitions E between successive data samples $C_{MSB}$, $C_{LSB}$ of the analog data signal 42 to classify at least some of these edge transitions E as very early, early, late or very late transitions. The processor 302 may use the mapping table shown on Table IV and stored in the memory 304 to assign (i) a first weight having a first sign to each very early transition, (ii) a second weight having the first sign to each early transition, (iii) a third weight having a second sign opposite from the first sign to each late transition, and (iv) a fourth weight having the second sign to each very late transition. The processor 302 then determines a phase error indication 810 based on a combination of the weights assigned to the at least some edge transitions. To this end, the processor 302 may for example implement one or more of the majority voting function, the summing function and the averaging function to determine the phase error indication 810. The processor 302 also determines a clock phase adjustment based on the phase error indication 810. In an implementation, the processor 302 may determine a plurality of successive phase error indications 810 based on a plurality of successive combinations of the weights assigned to the at least some edge transitions. The processor 302 may also filter the plurality of successive phase error indications 810 before generating each one of a plurality of successive clock phase adjustments. The clock phase adjustments are formatted by the processor 302 in the form of clock phase control signals 812 and forwarded via the output port 308 to the clock phase adjustment module 806.

In a variant of the CDR 58, the processor 302 may implement the features of the PD logic module 802 and output the phase error indication 810 via the output port 308 for application to the loop filter 804, which may be implemented in the analog domain, using passive components for example. The clock phase control signal 812 from the loop filter 804 may be in the form of a voltage directly applied to the VCO 814 of the clock phase adjustment module 806. Alternatively, the loop filter 804 may have a digital implementation, using accumulators and gain functions, the clock phase control signal 812 being applied as a digital signal to the clock phase adjustment module 806.

FIGS. 9a, 9b, 10a, 10b, 11a and 11b, 12a and 12b, which are described herein below, all provide simulation results obtained considering implementations of 4-PAM receivers operating at quarter-rate (M=4).

Figure 9B:
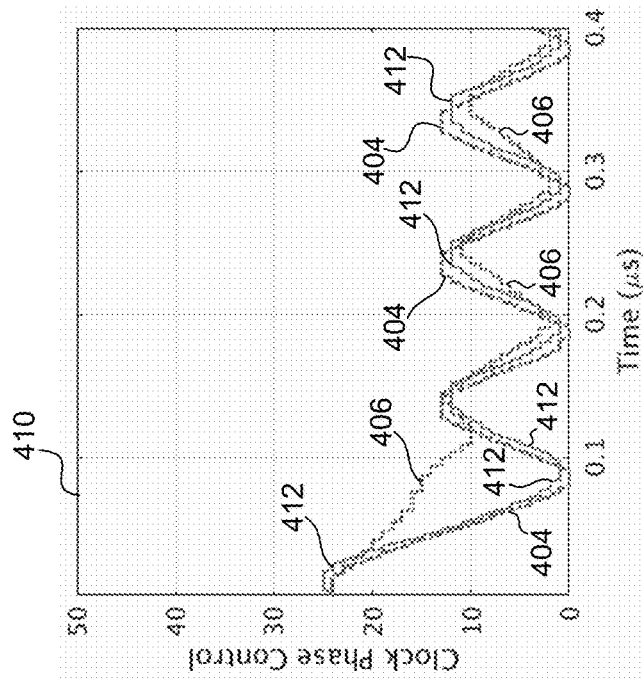
FIGS. 9a and 9b are graphs illustrating a clock recovery and tracking performance for three distinct configurations in the receiver
Figure 9A:
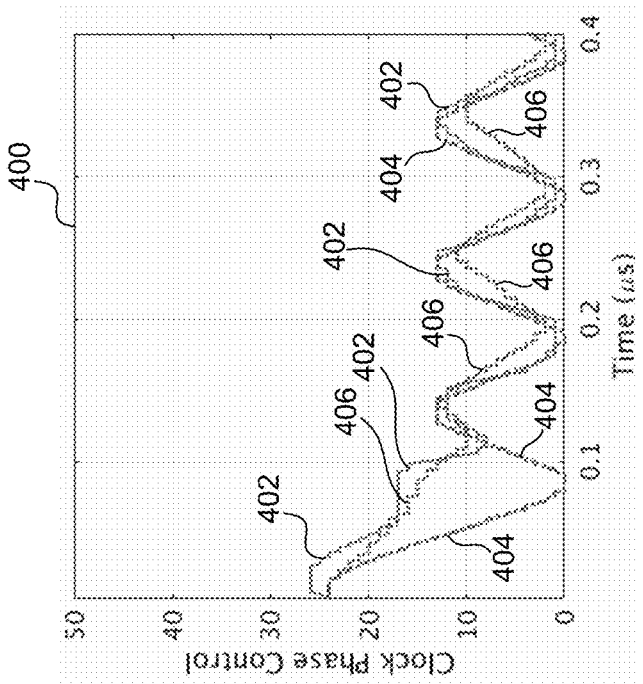

FIGS. 9a and 9b are graphs illustrating a clock recovery and tracking performance for three distinct configurations in the receiver 50. Both FIGS. 9a and 9b are obtained when a 10-MHz sinusoidal jitter with peak-to-peak amplitude of 0.4 unit interval (0.4 UI p2p sin jitter @ 10 MHz) is added to the analog data signal 42 received at the receiver 50. These results are obtained using an averaging function in both cases, FIG. 9a using heavy weights applied to very early and very late edge transitions, FIG. 9b using moderate weights that are somewhat smaller than the heavy but are nevertheless larger than the weights assigned to early and late transitions.

In more details, FIG. 9a shows, in a graph 400, a curve 402 depicting a variation of a clock phase control signal 812 applied to the clock phase adjustment module 806 of FIG. 2b as a function of time, in microseconds (μS) starting from the onset of a clock recovery process, when heavy weights are assigned to very early and very late edge transitions in the PD logic module 802. The clock phase control signals 812 are dimensionless and their values as shown are specific to an implementation of the clock phase adjustment module 806. The clock phase control signal 812 vary in time as the clock phase adjustment module 806 causes the recovered clock to track the sinusoidal jitter in the analog data signal 42.

In the graph 400, a curve 404 shows a variation of the clock phase control signals 812 applied to the clock phase adjustment module 806 of FIG. 2b as a function of time when using the S2P converter module 56 of FIG. 3, in which case the PD logic module 802 is informed of data and edge transitions as defined in Table III and determines successive phase error indications 810 without assigning distinct weights to different transitions, in a conventional manner. A curve 406 is obtained when using the S2P converter module 120 of FIG. 6, the PD logic module 802 only acting upon early or late detections shown in Table IV while not using any of the very early or very late detections, in a conventional manner.

Comparing the curves 404 and 406, reducing the number of edge latches from 12 in the S2P converter module 56 to only four (4) in the S2P converter module 120 without modifying the manner in which the PD logic module 802 analyses data and edge transitions would significantly delay proper clock recovery in the receiver 50. After initial clock recovery, the clock tracking performance in view of the phase jitter in the analog data signal 42 would also be reduced. As a result, data recovery errors could arise because data determination would oftentimes take place elsewhere than in the middle of each UI.

The curve 402 reveals that the clock recovery performance is not significantly improved, when using the four (4) edge latches of the S2P converter module 120 (M=4) in combination with the assignment of heavy weights to very early and very late edge transitions along with the use of the averaging function in the PD logic module 802, in comparison with the curve 406 obtained when using of the S2P converter module 120 with a conventional algorithm in the PD logic module 802. Clock tracking performance is however improved on the curve 402, when compared to the curve 406. The tracking performance is on both curves 402 and 404.

Turning now to FIG. 9b, a graph 410 reproduces the curves 404 and 406, also showing a curve 412 obtained when using the S2P converter module 120 in combination with the assignment of moderate weights to very early and very late edge transitions along with the use of the averaging function in the PD logic module 802. The clock recovery performance shown on the curve 412 is on par with the performance shown on the curve 404. Jitter tracking performance is generally similar on both curves 412 and 404.

Figure 10A:
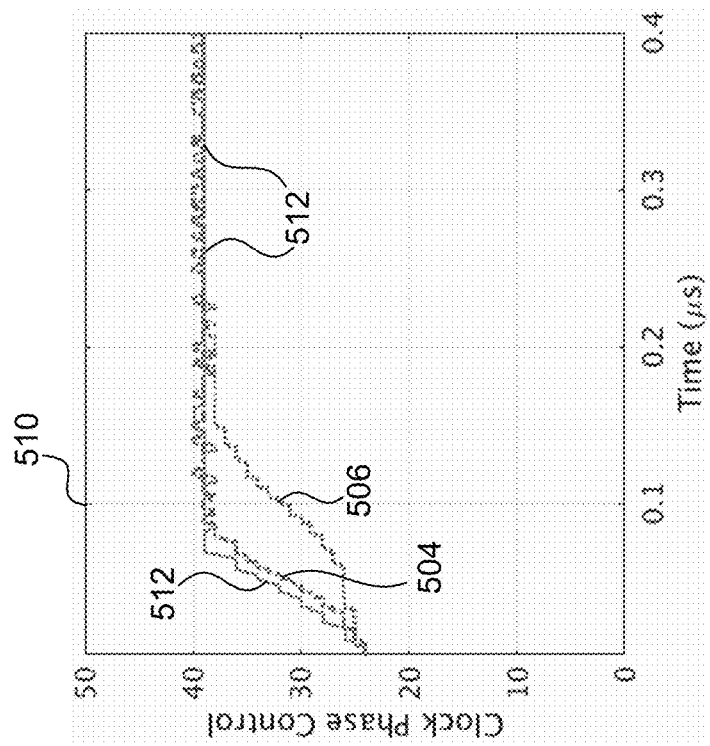
FIGS. 10a and 10b are further graphs illustrating a clock recovery and tracking performance for the two configurations of FIGS. 9a and 9b, respectively.
Figure 10B:
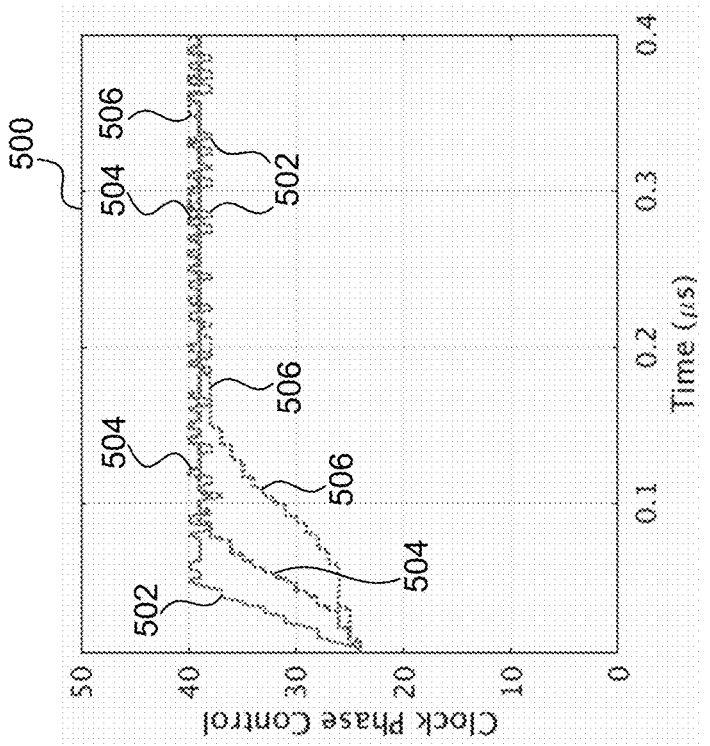

FIGS. 10a and 10b are further graphs illustrating a clock recovery and tracking performance for the two configurations of FIGS. 9a and 9b, respectively. While FIGS. 9a and 9b are obtained when a 10 MHz sinusoidal jitter with peak-to-peak amplitude of 0.4 unit interval is added (0.4 UI p2p sin jitter @ 10 MHz) is added to the analog data signal 42 received at the receiver 50. Given the much has frequency of the jitter, clock recovery challenges are different from those present in the case of FIGS. 9a and 9b.

FIG. 10a shows, in a graph 500, a curve 502 depicting a variation of the clock phase control signals 812 applied to the clock phase adjustment module 806 of FIG. 2b as a function of time, starting from the onset of a clock recovery process, using the same configuration as in the case of FIG. 9a. Though the clock phase control signals 812 still vary in time as the CDR 58 causes the recovered clock to track the sinusoidal jitter in the analog data signal 42, jitter tracking is somewhat less efficient given the very high jitter frequency, when compared with the case of FIGS. 9a and 9b. In the case of the 10 MHz jitter, the CDR 58 is able to track the jitter because its frequency is within a tracking bandwidth of the CDR 58. A 100 MHz the frequency is above the CDR tracking bandwidth. Therefore the CDR 58 attempts to reject the jitter instead of tracking it.

A curve 504 shows a variation of clock phase control signals 812 applied to the clock phase adjustment module 806 of FIG. 2b as a function of time when using the S2P converter module 56 of FIG. 3, in which case the PD logic module 802 evaluates transitions, in a conventional manner. A curve 506 is obtained when using the S2P converter module 120 of FIG. 6, the PD logic module 802 only acting upon early or late detections shown in Table IV while not using any of the very early or very late detections, in a conventional manner.

Comparing the curves 502 and 504, the clock recovery performance obtained when using the four (4) edge latches of the S2P converter module 120 (M=4) in combination with the assignment of heavy weights to very early and very late edge transitions along with the use of the averaging function in the PD logic module 802 surpasses the performance obtained when using the S2P converter module 56 having 12 edge latches (M=4) used along with the PD logical module 54 implementing a conventional algorithm. In contrast, the curve 506 reveals that clock recovery performance is reduced when using the four (4) edge latches of the S2P converter module 120 in combination with a conventional algorithm in the PD logic module 802. Tracking performance after initial clock recovery is similar in all cases.

Turning now to FIG. 10b, a graph 510 reproduces the curves 504 and 506 and introduces a curve 512 obtained when using the S2P converter module 120 in combination with the assignment of moderate weights to very early and very late edge transitions along with the use of the averaging function in the PD logic module 802. The clock recovery performance shown on the curve 512 is better than the performance shown on the curve 504, although not as good as in the case of the curve 502 of FIG. 10a. After initial clock recovery, jitter (or so called bang-bang jitter) performance is improved as shown on the curve 512.

Figure 11B:
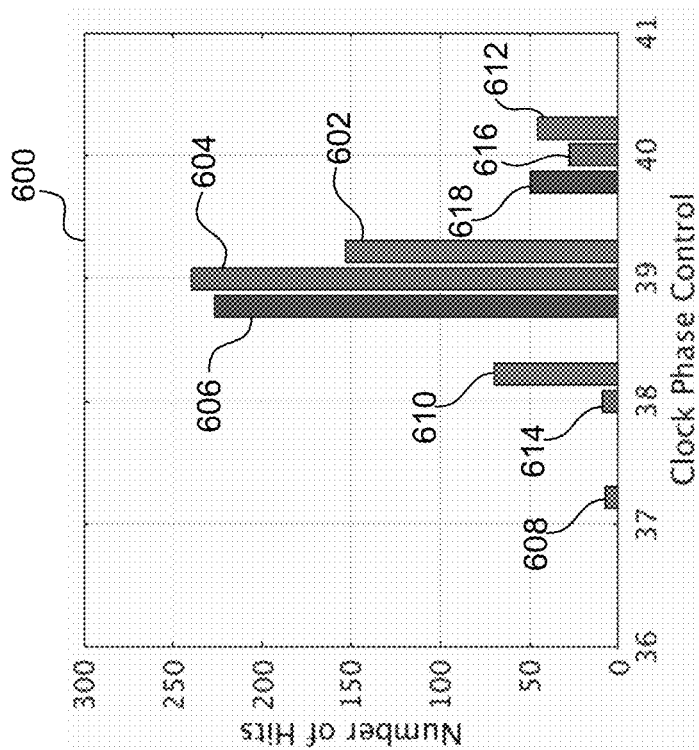
FIGS. 11a and 11b summarize variations in the clock phase control signal when the CDR is locked in FIGS. 10a and 10b, respectively.
Figure 11A:
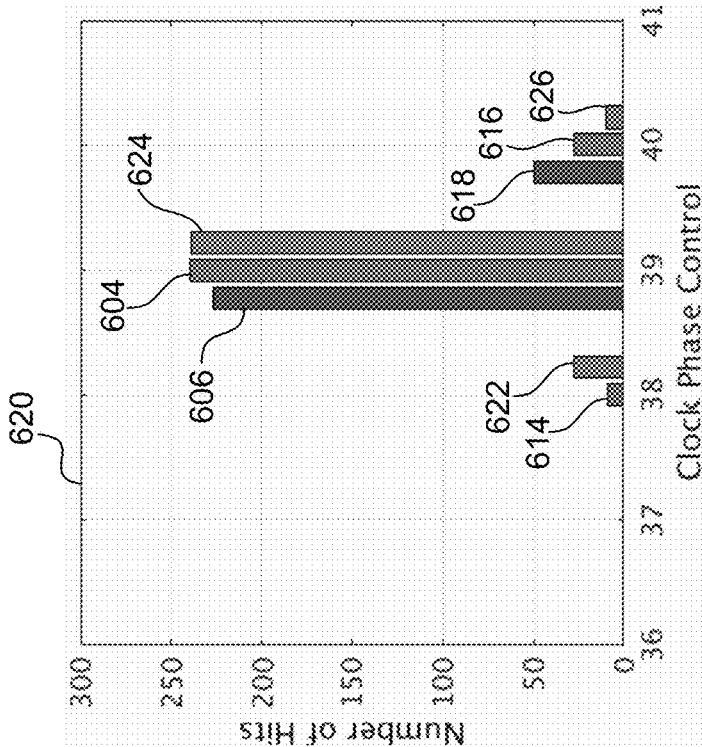

Though the curves 502 and 512 FIGS. 10a and 10b may not readily reveal which of heavy weights and moderate weights assigned to very early and very late transitions provides better jitter performance after initial clock recovery, under the same conditions (0.4 UI p2p sin jitter @ 100 MHz), consideration of frequencies of occurrences of the various clock phase control signal 812 after initial clock recovery may shed some additional light of their respective performances. FIGS. 11a and 11b summarize variations in the clock phase control signal 812 when the CDR 58 is locked in FIGS. 10a and 10b, respectively. On FIG. 11a, a histogram 600 provides numbers of times values of the clock phase control signal 812 as shown on a vertical axis of the graph 500 are repeated over a given period of time, after initial clock recovery. For example, considering a bin 602 for a value 39 of the clock phase control signal 812, this control signal value has been applied about 150 times at the clock phase adjustment module 806 when using the S2P converter module 120 (M=4, 4 edge latches) with heavy weights assigned to very early and very late transitions, about 240 times when using the S2P converter module 56 (M=4, 12 edge latches) with a conventional algorithm (bar 604), and about 230 times when using the AFE 120 (M=4, 4 edge latches) with a conventional algorithm (bar 606). Bars 608, 610 and 612 respectively show numbers of occurrences of values 37, 38 and 40 of the clock phase control signal 812 when using the S2P converter module 120 with heavy weights assigned to very early and very late transitions. Bars 614 and 616 respectively show numbers of occurrences of values 38 and 40 of the clock phase control signal 812 when using the using the S2P converter module 56 with a conventional algorithm. Bar 618 shows a number of occurrences of clock phase control signal 812 having the value 40 when using the S2P converter module 120 with a conventional algorithm.

On FIG. 11b, a histogram 620 provides numbers of times various clock phase control signal 812 as shown on a vertical axis of the graph 510 are repeated over the same period of time. Bars 622, 624 and 626 respectively show numbers of occurrences of the clock phase control signals 812 having the values 38, 39 and 40 when using the S2P converter module 120 with moderate weights assigned to very early and very late transitions. Bars 604, 606, 614, 616 and 618 are reproduced from FIG. 11a.

Comparing the histograms 600 and 620, using the S2P converter module 120 with moderate weights assigned to very early and very late transitions yields a tighter histogram than any other combination because fewer distinct clock phase control signals 812 values are used. A same clock phase control signal 812 (clock phase control signal 812 value of 39 being used about 240 times, bar 624) is used much more frequently than any other clock phase control signal 812 value. This stability of the clock phase control signals 812 indicates that the CDR 58 effectively minimizes the effects of the high-frequency sinusoidal received at the receiver 50.

A review of FIGS. 9a, 9b, 10a, 10b, 11a and 11b reveals that using the four (4) edge latches of the S2P converter module 120 (M=4, for a quarter rate implementation) while implementing an averaging function in the PD logic module 802 along with the use of heavy to moderate weights assigned to very early and very late detections provides performance results that are generally as good as or better than when using the S2P converter module 56, which has 12 edge latches (M=4), along with a conventional algorithm in the PD logic module 42. It may be observed that using the heavy weights tends to improve the tracking bandwidth of the receiver 50, speeding up the clock recovery. In contrast, using the moderate weights tends to improve high frequency jitter tolerance, as shown on FIG. 11b.

Figure 12B:
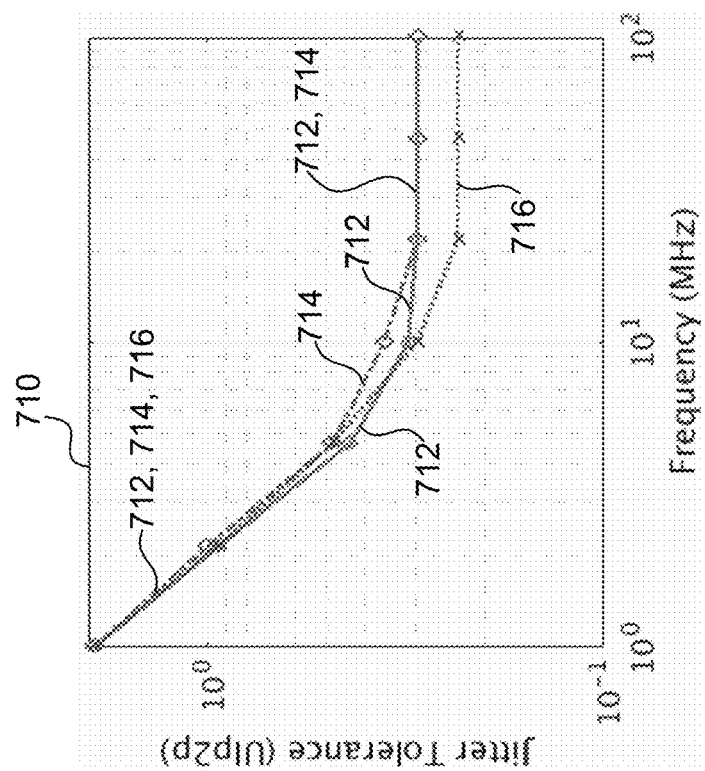
FIGS. 12a and 12b provide graphs comparing jitter tracking performances using various receiver and phase detector implementations.
Figure 12A:
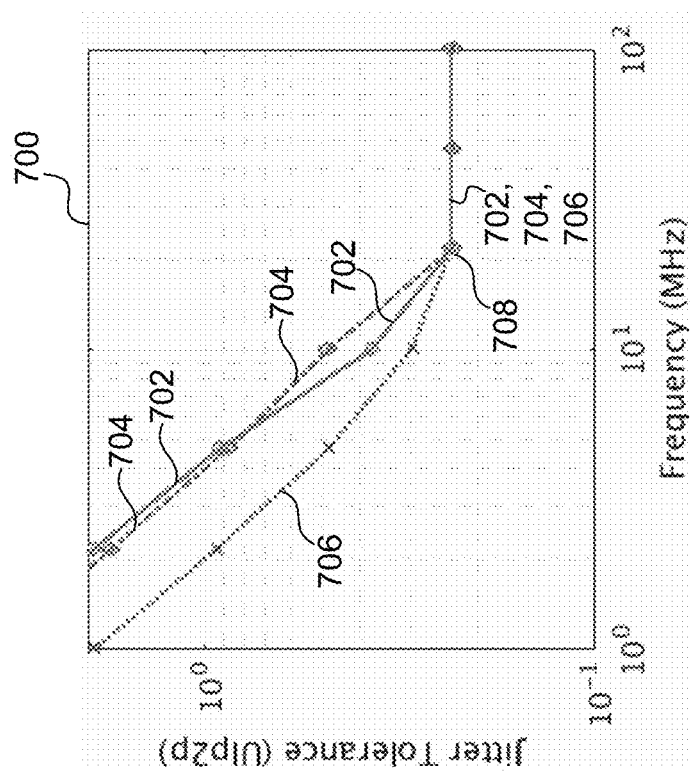

FIGS. 12a and 12b provide graphs comparing jitter tracking performances using various receiver and phase detector implementations. Performance values are provided when using the S2P converter module 56 with a conventional algorithm in the PD logic module 802, using the S2P converter module 120 with a conventional algorithm in the PD logic module 802, and using the S2P converter module 120 with the averaging function along with heavy or moderate weights assigned to very early and very late transitions in the PD logic module 802.

On FIG. 12a, a graph 700 provides a jitter tolerance (JT) curve 702 obtained when using the S2P converter module 120 with moderate weights and the averaging function implemented in the PD logic module 802. A JT curve 704 is obtained when using the S2P converter module 56 with a conventional algorithm in the PD logic module 802. A JT curve 706 is obtained when using the S2P converter module 120 with a conventional algorithm in the PD logic module 802. On FIG. 12a, parameters of the loop filter 804 are adjusted so that all solutions provide a similar high-frequency JT. Moderate weights are used in the case of the JT curve 702, also in view of providing good high-frequency JT. In the example of FIG. 12a, the JT curves 702, 704 and 706 meet at a point 708, which corresponds to about 0.23 UI p2p tolerance at 24 MHz jitter frequency.

Considering the JT curve 702, at a 2 MHz jitter frequency, errors start to appear in the data recovered at the receiver 50 when the jitter amplitude is at 2 UI p2p or greater. At 10 MHz, the JT curve 702 is at close to 0.4 UI p2p. By comparison, the JT curve 704 shows comparable tolerance at a 2 MHz jitter frequency, and a slightly better tolerance at 10 MHz (about 0.5 UI p2p). The JT curves 702 and 704 show quite similar performance. The JT curve 706 shows a smaller jitter tolerance at low jitter frequencies (for example about 1 UI p2p at 2 MHz). Assuming that it is desired for the receiver 50 to be able to withstand 0.4 UI p2p jitter, the tracking bandwidth on the JT curves 702 and 704 is at about 10 MHz while it is only at 6 MHz for the JT curve 706.

On FIG. 12b, a graph 710 provides a JT curve 712 obtained when using the S2P converter module 120 with moderate weights and the averaging function implemented in the PD logic module 802. A JT curve 714 is obtained when using the S2P converter module 56 with a conventional algorithm in the PD logic module 802. A JT curve 716 is obtained when using the S2P converter module 120 with a conventional algorithm in the PD logic module 802. This time, parameters of the loop filter 804 are adjusted so that all solutions provide a similar low-frequency jitter tolerance (JT). Moderate weights are used in the case of the JT curve 712, also in view of providing good low-frequency JT. In the example of FIG. 12b, the JT curves 712, 714 and 716 show very similar performance at jitter frequencies up to about 10 MHz. Jitter tolerance degrades faster at higher frequencies on the JT curve 716 than on the JT curves 712 and 714. JT curves 712 and 714 show comparable tracking bandwidths.

Those of ordinary skill in the art will realize that the description of the method and receiver for recovering a signal clock from a received data signal are illustrative only and are not intended to be in any way limiting. Other embodiments will readily suggest themselves to such persons with ordinary skill in the art having the benefit of the present disclosure. Furthermore, the disclosed method and receiver may be customized to offer valuable solutions to existing needs and problems related to the complexity and power consumption of receiver front-end components. In the interest of clarity, not all of the routine features of the implementations of the method and receiver are shown and described. In particular, combinations of features are not limited to those presented in the foregoing description as combinations of elements listed in the appended claims form an integral part of the present disclosure. It will, of course, be appreciated that in the development of any such actual implementation of the method and receiver, numerous implementation-specific decisions may need to be made in order to achieve the developer's specific goals, such as compliance with application-, system-, and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of digital communication technology having the benefit of the present disclosure.

In accordance with the present disclosure, the components, process operations, and/or data structures described herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of operations is implemented by a computer, a processor operatively connected to a memory, or a machine, those operations may be stored as a series of instructions readable by the machine, processor or computer, and may be stored on a non-transitory, tangible medium.

Systems and modules described herein may comprise software, firmware, hardware, or any combination(s) of software, firmware, or hardware suitable for the purposes described herein. Software and other modules may be executed by a processor and reside on a memory of servers, workstations, personal computers, computerized tablets, personal digital assistants (PDA), and other devices suitable for the purposes described herein. Software and other modules may be accessible via local memory, via a network, via a browser or other application or via other means suitable for the purposes described herein. Data structures described herein may comprise computer files, variables, programming arrays, programming structures, or any electronic information storage schemes or methods, or any combinations thereof, suitable for the purposes described herein.

The present disclosure has been described in the foregoing specification by means of non-restrictive illustrative embodiments provided as examples. These illustrative embodiments may be modified at will. The scope of the claims should not be limited by the embodiments set forth in the examples, but should be given the broadest interpretation consistent with the description as a whole.

What is claimed is:

1. A method implemented in a receiver for recovering a signal clock from a received data signal, comprising:
   detecting, according to a clock recovered in the receiver, a plurality of successive edge transitions between successive data samples of the received data signal; and
   adjusting the recovered clock based on a combination of weights assigned to at least some edge transitions among the plurality of successive edge transitions, wherein (i) each very early transition is assigned a first weight having a first sign, (ii) each early transition is assigned a second weight having the first sign, (iii) each late transition is assigned a third weight having a second sign opposite from the first sign, and (iv) each very late transition is assigned a fourth weight having the second sign.

2. The method of claim 1, further comprising deriving clock adjustments from phase error indications based on the combination of the weights.

3. The method of claim 2, wherein adjusting the recovered clock comprises:
   delaying the recovered clock when a given phase error indication indicates that a phase of the recovered clock precedes a phase of the signal clock; and
   advancing the recovered clock when the given phase error indication indicates that the phase of the recovered clock is behind the phase of the signal clock.

4. The method of claim 1, wherein the second and third weights have a first magnitude, the first and fourth weights having a second magnitude greater than the first magnitude.

5. The method of claim 2, further comprising filtering successive phase error indications to provide a long term clock phase adjustment, wherein adjusting the recovered clock based on the phase error indications comprises adjusting the recovered clock based on the long term clock phase adjustment.

6. The method of claim 2, wherein each phase error indication is determined as one of:
   equal to the first weight when a number of very early transitions exceeds a number of very late transitions;
   equal to the fourth weight when the number of very late transitions exceeds the number of very early transitions;
   equal to the second weight when a number of early transitions exceeds a number of late transitions while the number of very early transitions is equal to the number of very late transitions;
   equal to the third weight when the number of late transitions exceeds the number of early transitions while the number of very early transitions is equal to the number of very late transitions; and
   a neutral value when the number of late transitions is equal to the number of early transitions while the number of very early transitions is equal to the number of very late transitions.

7. The method of claim 2, wherein determining each phase error indication further comprises determining a sum of the weights assigned to the at least some edge transitions.

8. The method of claim 7, wherein determining each phase error indication further comprises dividing the sum of the weights assigned to the at least some edge transitions by an averaging factor.

9. The method of claim 1, wherein:
   the recovered clock comprises an edge clock and a data clock, the edge and data clocks sharing a same frequency and being separated by a phase difference;
   detecting a given edge transition among the plurality of successive edge transitions between the successive data samples of the received data signal comprises:
      determining a first value of the received data signal upon a first transition of the data clock,
      determining a second value of the data signal upon a transition of the edge clock immediately following the first transition of the data clock, and
      determining a third value of the received data signal upon a second transition of the data clock immediately following the transition of the edge clock; and
   wherein the given edge transition is classified by applying the first, second and third values of the received data signal to a mapping table containing edge transition classes as a function of the first, second and third values of the received data signal.

10. The method of claim 9, further comprising:
   decoding a first data sample by comparing the first value of the received data signal to a high threshold, a middle threshold and a low threshold, wherein the first data sample is equal to:
      a first logical value if the first value is greater than the high threshold,
      a second logical value if the first value is less than the high threshold and greater than the middle threshold,
      a third logical value if the first value is less than the middle threshold and greater than the low threshold, and
      a fourth logical value if the first value is less than the low threshold;
   decoding a second data sample by comparing the third value of the received data signal to the high threshold, the middle threshold and the low threshold, wherein the first data sample has:
      the first logical value if the third value is greater than the high threshold,
      the second logical value if the third value is less than the high threshold and greater than the middle threshold,
      the third logical value if the third value is less than the middle threshold and greater than the low threshold, and
      the fourth logical value if the third value is less than the low threshold;
   evaluating a given edge sample at the given edge transition by comparing the second value of the received data signal to the middle threshold, wherein the given edge sample is equal to a fifth logical value if the second value is greater than the middle threshold and equal to a sixth logical value if the second value is less than the middle threshold.

11. The method of claim 10, wherein:
   the first logical value is (1,1);
   the second logical value is (1,0);
   the third logical value is (0,1);
   the fourth logical value is (0,0);
   the fifth logical value is (1); and
   the sixth logical value is (0).

12. The method of claim 10, wherein, in the mapping table:
   the given edge transition is classified as very late when the first data sample is equal to the fourth logical value, the second data sample is equal to the second logical value, and the given edge sample is equal to the fifth logical value;
   the given edge transition is classified as very late when the first data sample is equal to the first logical value, the second data sample is equal to the third logical value, and the given edge sample is equal to the sixth logical value;
   the given edge transition is classified as very early when the first data sample is equal to the third logical value, the second data sample is equal to the first logical value, and the given edge sample is equal to the sixth logical value;
   the given edge transition is classified as very early when the first data sample is equal to the second logical value, the second data sample is equal to the fourth logical value, and the given edge sample is equal to the fifth logical value;
   the given edge transition is classified as early when the first data sample is equal to the fourth logical value, the second data sample is equal to the first logical value, and the given edge sample is equal to the sixth logical value;
   the given edge transition is classified as late when the first data sample is equal to the fourth logical value, the second data sample is equal to the first logical value, and the given edge sample is equal to the fifth logical value;
   the given edge transition is classified as early when the first data sample is equal to the first logical value, the second data sample is equal to the fourth logical value, and the given edge sample is equal to the fifth logical value;
   the given edge transition is classified as late when the first data sample is equal to the first logical value, the second data sample is equal to the fourth logical value, and the given edge sample is equal to the sixth logical value; and the given edge transition is classified as unknown in other combinations of the first data sample, the second data sample and the given edge sample.

13. The method of claim 1, wherein the receiver is selected from a quarter-rate receiver and a higher-order receiver.

14. The method of claim 1, wherein:
the receiver operates at quarter-rate;
the recovered clock has four distinct phases; and
four successive edge transitions of the plurality of successive edge transitions are detected according to four successive recovered clock phases.

15. A receiver, comprising:
an analog front-end adapted for receiving a data signal from a channel;
a serial to parallel converter module comprising at least one edge latch adapted for detecting, according to a recovered clock, a plurality of successive edge transitions between successive data samples of the received data signal; and
a clock-data recovery (CDR) module adapted for generating the recovered clock based on a combination of weights assigned to at least some edge transitions among the plurality of successive edge transitions, wherein (i) each very early transition is assigned a first weight having a first sign, (ii) each early transition is assigned a second weight having the first sign, (iii) each late transition is assigned a third weight having a second sign opposite from the first sign, and (iv) each very late transition is assigned a fourth weight having the second sign.

16. The receiver of claim 15, wherein the CDR module is further adapted for deriving clock adjustments from phase error indications based on the combination of the weights.

17. The receiver of claim 16, wherein the CDR module comprises:
a phase detection logic module adapted to classify the at least some edge transitions, assign the first, second third and fourth weights to each of the at least some edge transitions, and determine the phase error indications;
a filter adapted to filter a plurality of successive phase error indications to generate the clock phase control signal; and
a clock phase adjustment module adapted to generate the recovered clock according to the clock phase control signal.

18. The receiver of claim 17, wherein the clock phase adjustment module further comprises:
a clock generator adapted for creating a base clock signal; and
a phase interpolator module adapted to generate the recovered clock by modifying a phase of the base clock signal according to the clock phase control signal.

19. The receiver of claim 17, wherein the clock phase adjustment module further comprises an oscillator adapted for generating the recovered clock in response to the clock phase control signal.

20. The receiver of claim 16, wherein the CDR module is further adapted for determining a plurality of successive phase error indications based on a plurality of successive combinations of the weights assigned to the at least some edge transitions.

21. The receiver of claim 15, wherein:
the recovered clock includes four edge clock phases; and
the at least one edge latch comprises four edge latches, each of the four edge latches being adapted for detecting every fourth one of the plurality of successive edge transitions according to a corresponding one of the four edge clock phases.

22. The receiver of claim 21, further comprising a first reference module providing a middle threshold, each of the four edge latches detecting every fourth one of the plurality of successive edge transitions by comparing a level of the data signal with the middle threshold.

23. The receiver of claim 22, further comprising a second reference module providing a high threshold and a third reference module proving a low threshold, wherein:
the recovered clock further includes four data clock phases corresponding to the four edge clock phases, each pair comprising a data clock phase and a corresponding edge clock phase being separated by a phase difference;
the analog front-end further comprises first, second and third groups of data latches, each one of the first, first, second and third groups of data latches comprising four data latches;
each of the four data latches in the first group of data latches is adapted for comparing the level of the data signal with the high threshold according to a corresponding one of the four data clock phases;
each of the four data latches in the second group of data latches is adapted for comparing the level of the data signal with the middle threshold according to a corresponding one of the four data clock phases; and
each of the four data latches in the third group of data latches is adapted for comparing the level of the data signal with the low threshold according to a corresponding one of the four data clock phases.

24. The receiver of claim 23, further comprising:
a thermometer to binary converter adapted for combining comparison results from the first, second and third groups of data latches into four successive pairs of bits, each pair including a most significant bit and a least significant bit indicating a value of a corresponding data sample;
a first serial-to-parallel converter adapted for combining a plurality of successive most significant bits indicating values of successive data samples into a first word;
a second serial-to-parallel converter adapted for combining a plurality of successive least significant bits indicating values of successive data samples into a second word; and
a third serial-to-parallel converter adapted for combining a plurality of successive comparison results from the four edge latches into a third word;
wherein the CDR module is further adapted for classifying the at least some edge transitions among the plurality of successive edge transitions based on contents of the first, second and third words.

25. The receiver of claim 24, wherein each of the first, second and third words is a 32-bit word.

26. A non-transitory computer readable medium having computer executable instructions stored thereon that, when executed, cause a processor to:
receive indications of a plurality of successive edge transitions between successive data samples of a data signal;
classify at least some edge transitions among the plurality of successive edge transitions as very early, early, late or very late transitions;

assign (i) a first weight having a first sign to each very early transition, (ii) a second weight having the first sign to each early transition, (iii) a third weight having a second sign opposite from the first sign to each late transition, and (iv) a fourth weight having the second sign to each very late transition;

determine a phase error indication based on a combination of the weights assigned to the at least some edge transitions; and determine a clock phase adjustment based on the phase error indication.

27. The non-transitory computer readable medium of claim 26, further having computer executable instructions stored thereon that, when executed, cause the processor to:

determine a plurality of successive phase error indications based on a plurality of successive combinations of the weights assigned to the at least some edge transitions; and filter the plurality of successive phase error indications before generating each one of a plurality of successive clock phase adjustments.

\* \* \* \* \*